United States Patent
Nishimori

(10) Patent No.: US 9,082,443 B2
(45) Date of Patent: Jul. 14, 2015

(54) GLASS SUBSTRATE FOR MAGNETIC DISK AND MAGNETIC RECORDING MEDIUM

(71) Applicants: HOYA CORPORATION, Shinjuku-ku, Tokyo (JP); HOYA GLASS DISK (THAILAND) LTD., Amphur Muang, Lamphun (TH)

(72) Inventor: Kenichi Nishimori, Lamphun (TH)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 13/644,835

(22) Filed: Oct. 4, 2012

(65) Prior Publication Data

US 2013/0089754 A1    Apr. 11, 2013

(30) Foreign Application Priority Data

Oct. 5, 2011    (JP) ................. 2011-221366

(51) Int. Cl.
G11B 5/73    (2006.01)
G11B 5/82    (2006.01)

(52) U.S. Cl.
CPC ............... *G11B 5/7315* (2013.01); *G11B 5/82* (2013.01); *Y10T 428/1157* (2015.01)

(58) Field of Classification Search
CPC ...... G11B 3/687; G11B 5/82; G11B 2220/20; G11B 5/8255; C03C 19/00
USPC .......... 428/828, 846.9, 848.2, 826; 65/30.14, 65/29.14, 158; 501/63, 64, 69, 70; 360/31, 360/73.03, 135, 76; 451/41
See application file for complete search history.

(56) References Cited

U.S. PATENT DOCUMENTS

| 6,639,758 | B2 | 10/2003 | Ohta et al. |
| 2001/0014573 | A1 | 8/2001 | Shimoi et al. |
| 2002/0176199 | A1* | 11/2002 | Gomez et al. .................. 360/75 |
| 2008/0218894 | A1* | 9/2008 | Tomita ........................ 360/73.03 |
| 2009/0097152 | A1* | 4/2009 | Gao et al. ...................... 360/135 |
| 2010/0024484 | A1* | 2/2010 | Kashima et al. ............. 65/29.14 |
| 2010/0040907 | A1* | 2/2010 | Takizawa et al. ........... 428/846.9 |
| 2010/0053790 | A1* | 3/2010 | Hayashi et al. ................. 360/31 |
| 2010/0081013 | A1* | 4/2010 | Nishimori et al. .......... 428/848.2 |
| 2010/0167091 | A1* | 7/2010 | Tachiwana et al. ......... 428/846.9 |
| 2011/0039126 | A1* | 2/2011 | Kawai ......................... 428/846.9 |
| 2011/0123834 | A1* | 5/2011 | Hoshino et al. ............. 428/846.9 |

(Continued)

FOREIGN PATENT DOCUMENTS

| JP | 8-147691 A | 6/1996 |
| JP | 2000-76652 A | 3/2000 |
| JP | 2001-243735 A | 9/2001 |

(Continued)

OTHER PUBLICATIONS

Translation Nichimori JJ 2011-198429, Oct. 2006.*

(Continued)

*Primary Examiner* — Kevin Bernatz
(74) *Attorney, Agent, or Firm* — Sughrue Mion, PLLC

(57) ABSTRACT

With regard to a glass substrate 1 according to the present invention, a value of an amendment concentricity AC that has taken into consideration Sk and/or Ku calculated from a shape profile over the whole circumference of an inside hole, or the skewness is within a predetermined range. The glass substrate for a magnetic recording medium can stably read servo information including track information stored on a magnetic disk when the glass substrate is used for an HDD.

7 Claims, 18 Drawing Sheets

(56) References Cited

U.S. PATENT DOCUMENTS

| | | | |
|---|---|---|---|
| 2011/0159319 A1* | 6/2011 | Yamasaki et al. | 428/846.9 |
| 2011/0189505 A1 | 8/2011 | Ono et al. | |

FOREIGN PATENT DOCUMENTS

| | | | | |
|---|---|---|---|---|
| JP | 2001240420 A | * | 9/2001 | |
| JP | 2006351081 A | * | 12/2006 | |
| JP | 2007-197235 A | | 8/2007 | |
| JP | 2011-156627 A | | 8/2011 | |
| JP | 2011-198428 A | | 10/2011 | |
| JP | 2011-198429 A | | 10/2011 | |
| JP | 2011-210311 A | | 10/2011 | |
| JP | 2011198428 A | * | 10/2011 | |
| JP | 2011198429 A | * | 10/2011 | |

OTHER PUBLICATIONS

Translation Nichimori JP 2011-198428, Oct. 2006.*
"Definitions and Designations of Geometrical Deviations", JIS B 0621-1984, http://www.jisc.go.jp/app/JPS/JPSO0020.html, 1984.
"Machine tools—Test codes—Vocabulary", JIS B 0182-1993, http://www.jisc.go.jp/app/JPS/JPSO0020.html, 1993.
Japanese Office Action mailed Jan. 16, 2013, issued in corresponding Japanese Patent Application No. 2012-209191.

* cited by examiner $$M = \sum_{i=0}^{n} r_i{}^{\wedge}2 \cdot \Delta t_i$$

GLASS SUBSTRATE FOR MAGNETIC DISK AND MAGNETIC RECORDING MEDIUM

This application is based upon and claims the benefit of priority from Japanese Patent Application No. 2011-221366, filed on Oct. 5, 2011, the disclosure of which is incorporated herein in its entirety by reference.

BACKGROUND OF THE INVENTION

The present invention relates to a glass substrate for a magnetic disk and a method of evaluating the same.

Information recording technology, particularly magnetic recording technology, has greatly been advanced along with enhancement of computerization technology in recent years.

One of examples of such magnetic recording technology is a hard disk drive (HDD). A hard disk drive has primary components including a magnetic disk with a disk-like substrate and a magnetic recording layer of a magnetic thin film formed on a surface of the substrate, a spindle motor operable to rotate the magnetic disk at a high speed, a magnetic head attached to an end of a swing arm for reading magnetic data from and writing magnetic data into the magnetic recording layer of the magnetic disk, and a positioner operable to move the magnetic head on the magnetic disk in a radial direction of the magnetic disk. See, e.g., JP-A-2001-243735 (Patent Document 1).

Generally, a hard disk drive has two magnetic heads for one magnetic disk because a magnetic head is arranged for each of magnetic recording layers formed on front and rear main surfaces of a magnetic disk. Heretofore, an aluminum substrate has widely been used as a substrate for a magnetic recording medium.

In recent years, however, reduction in size, reduction in thickness, and increase in recording density of magnetic disks have increased demands for a glass substrate because a glass substrate is superior to an aluminum substrate in flatness of a surface of a substrate and in strength of a substrate.

Heretofore, a glass substrate has been produced by, for example, forming glass into a disk, chamfering the disk, polishing edge surface and main surfaces, and then performing a chemical strengthening treatment on the disk for improving shock resistance and vibration resistance, as described at paragraph [0004] of JP-A-2000-076652 (Patent Document 2).

Recording layers of magnetic layers are provided on both surfaces of a glass substrate thus produced. Such a glass substrate has been used as a magnetic recording medium.

Meanwhile, in a case of a glass substrate for a magnetic disk, an inside hole is formed in the glass substrate in order to couple a spindle motor to the glass substrate. The shape of the inside hole should preferably be close to a perfect circle in order to prevent run-out during rotation or track mis-registration (TMR) caused by such run-out.

Generally, the circularity has been known as an index of the closeness to a perfect circle.

The circularity is an index that indicates the degree of deviation from a geometrically correct circle of a circular shape. According to the conventional definition, for example, according to JIS standards, the circularity of a circular shape is defined as a difference of radii of two concentric circles that interpose the circular shape therebetween with a minimized interval. See JIS B 0621-1984 (Non-Patent Document 1).

Specifically, the circularity of an inside hole formed in a substrate for a magnetic disk is defined by measuring a shape profile of the whole circumference of the inside hole and calculating a difference between a radius of a circumscribed circle with the maximum value of the profile and a radius of an inscribed circle with the smallest value of the profile.

A circumscribed circle described herein refers to a circle of the two concentric circles according to the aforementioned definition of the circularity that has a larger radius (a circle tangent to the outermost point of the profile). An inscribed circle described herein refers to a circle of the two concentric circles that has a smaller radius (a circle tangent to the innermost point of the profile).

Since glass substrates for a magnetic disk are usually mass-produced, the circularity of inner holes of glass substrates may vary. Therefore, glass substrates are produced so that such variations are within a predetermined range (dimensional tolerance).

In a case of a glass substrate for a magnetic disk, an inside hole is formed in the glass substrate in order to couple a spindle motor to the glass substrate. In another aspect, the center of the inside hole should preferably coincide with the center of a circle drawn by an outer circumferential edge of the glass substrate in order to minimize run-out or track mis-registration (TMR) during rotation.

In a case of a glass substrate for a magnetic disk, the outer circumferential edge of the glass substrate and the inside hole do not form perfect circles in practice. The outer circumferential edge of the glass substrate and the inside hole form an annular shape with irregularities. Therefore, there is required an index indicating the coincidence of centers of those shapes.

Indexes for evaluating the degree of such coincidence include the concentricity (coaxiality).

According to Japanese Industrial Standards (JIS), the concentricity is defined as follows: The degree of disagreement of axes of two mechanical parts that are arranged so as to have a common axis. The concentricity is expressed by a measured distance between several points within a specified length of two lines or two axes. When that distance is not greater than an allowance, those axes are deemed to be coaxial, coincident, or concentric (held in alignment). In the case of two axes, the distance is ½ of a maximum difference of measured values obtained when a test indicator is attached to one of the axes and swung. See JIS B 0182: 1993 Machine Tools-Test Codes-Vocabulary (Non-Patent Document 2).

In a case of a disk such as a substrate for a magnetic disk, there are two profiles for a part relating to an outside diameter (outer circumference) and a part relating to an inside diameter (inner circumference). Therefore, the concentricity is generally defined by a difference between a center of a least-square-approximated circle of the outer circumferential profile and a center of a least-square-approximated circle of the inner circumferential profile.

Since glass substrates for a magnetic disk are usually mass-produced, the concentricity of glass substrates may vary. Therefore, glass substrates are produced so that such variations are within a predetermined range (dimensional tolerance).

Furthermore, a glass substrate for a magnetic disk is formed so as to have a predetermined thickness depending upon the thickness required for the magnetic disk. In another aspect, the thickness of glass substrates should preferably be held constant in order to minimize run-out during rotation or track mis-registration (TMR) caused by such run-out.

The thickness of a glass substrate has heretofore been defined by one or more distances between both of main surfaces of the glass substrate that have been measured at one point or at a plurality of points on the glass substrate. See, e.g., JP-A 8-147691 (Patent Document 3).

Since glass substrates for a magnetic disk are usually mass-produced, the thickness of glass substrates may vary. Therefore, glass substrates are produced so that such variations are within a predetermined range (dimensional tolerance).

SUMMARY OF THE INVENTION

Meanwhile, recent increase in recording density of HDDs and recent enhancement of rotational speed of HDDs have tended to show an influence of TMR, that is, a phenomenon in which a magnetic head flying above a magnetic disk loses track of servo information including track information that stores radius/track location information due to flattering of the disk more significantly than before.

A primary cause for this phenomenon is a reading error due to reduction of a track width for improving the recording density and mechanical vibration of a disk rotating at a high speed.

Therefore, a glass substrate for a magnetic disk requires higher precision than before in (A) the circularity, (B) the concentricity, and (C) the thickness of glass, for example, so that the magnetic disk can rotate so stably that a magnetic head does not lose track of servo information including track information due to reduction of the track width of the magnetic disk and enhancement of the rotational speed of an HDD. Such demands generally become significant for HDDs having performances of 80 GB or more and 5,400 rpm or higher.

However, with regard to (A) the circularity, even if a glass substrate for a magnetic disk is produced while a dimensional tolerance is managed according to the conventional definition of the circularity, a phenomenon of losing track of servo information cannot completely be eliminated in some cases when an HDD is produced by using the glass substrate for a magnetic disk (first problem).

Specifically, some of glass substrates for a magnetic recording medium that have the same circularity can exclude the influence of TMR as described above, and others cannot. In some cases, the quality of glass substrates cannot clearly be identified only by a conventional parameter of a difference between a radius of a circumscribed circle with the maximum value of an outer circumference/inside hole profile and a radius of an inscribed circle with the smallest value of the profile. The causal relation between TMR and a two-dimensional shape has not been made clear.

Thus, a first aspect of the present invention is for improving the first problem as described above. An object of the first aspect of the present invention is to provide a glass substrate for a magnetic recording medium that can stably read servo information including track information stored on a magnetic disk when the glass substrate is used for an HDD.

With regard to (B) the concentricity, even if a glass substrate for a magnetic disk is produced while a dimensional tolerance is managed according to the conventional definition of the concentricity, a phenomenon of losing track of servo information cannot completely be eliminated in some cases when an HDD is produced by using the glass substrate for a magnetic disk (second problem).

Specifically, some of glass substrates for a magnetic recording medium that have the same concentricity can exclude an influence of TMR as described above, and others cannot. In some cases, the quality of glass substrates cannot clearly be identified only by a conventional parameter of a distance between centers of an outside diameter profile and an inside diameter profile. The causal relation between TMR and a two-dimensional shape has not been made clear.

Thus, a second aspect of the present invention is for improving the second problem as described above. An object of the second aspect of the present invention is to provide a glass substrate for a magnetic recording medium that can stably read servo information including track information stored on a magnetic disk when the glass substrate is used for an HDD.

With regard to (C) the thickness of glass, even if a glass substrate for a magnetic disk is produced while a dimensional tolerance is managed according to the conventional definition of the thickness, a phenomenon of losing track of servo information cannot completely be eliminated in some cases when an HDD is produced by using the glass substrate for a magnetic disk (third problem).

Specifically, some of glass substrates for a magnetic recording medium that have the same thickness can exclude an influence of TMR as described above, and others cannot. In some cases, the quality of glass substrates cannot clearly be identified only by a conventional parameter of one or more distances between both of main surfaces that have been measured at one point or at a plurality of points on the glass substrate. The causal relation between TMR and a two-dimensional shape has not been made clear.

Thus, a third aspect of the present invention is for improving the third problem as described above. An object of the second aspect of the present invention is to provide a glass substrate for a magnetic recording medium that can stably read servo information including track information stored on a magnetic disk when the glass substrate is used for an HDD.

The inventor has diligently studied to solve the first problem. The inventor has focused on the fact that the conventional definition of the circularity is a mere index indicating a difference between a maximum value and a minimum value of a profile of an inside hole and that variations and positional dependencies in a profile are not taken into consideration by the conventional definition of the circularity.

Specifically, glass substrates are evaluated as having the same circularity as long as a maximum value and a minimum value of a profile of an inside hole are the same, whether or not winding (irregularities) of a shape of the inside hole is present unevenly at a specific portion or is present uniformly.

The inventor's further study has revealed that a causal relation between TMR and a shape of an inside hole can be obtained by using an index that has taken into consideration variations and winding positions of the shape of the inside hole for evaluating the shape of the inside hole. Thus, the inventor has completed the first aspect of the present invention.

Specifically, the first aspect of the present invention has the following configuration in order to solve the first problem.

(Structure 1-1)

A glass substrate for a magnetic disk with an inside hole formed therein, wherein a parameter indicating an uneven distribution of irregularities of a profile of the inside hole is within a predetermined range.

(Structure 1-2)

The glass substrate for a magnetic disk as recited in Structure 1-1, wherein the parameter includes a difference in a radial direction between the profile of the inside hole and an inscribed circle of the profile with the smallest value in the profile of the inside hole or a least-square-approximated circle of the profile of the inside hole.

(Structure 1-3)

The glass substrate for a magnetic disk as recited in Structure 1-2, wherein the difference is a difference between the profile of the inside hole and the inscribed circle or the least-square-approximated circle of the profile of the inside hole on a line drawn from a center of a circle calculated by a least-square approximation of the profile of the inside hole to the inscribed circle of the profile with the smallest value in the profile of the inside hole or the least-square-approximated circle of the profile of the inside hole.

(Structure 1-4)

The glass substrate for a magnetic disk as recited in any one of Structures 1-1 to 1-3, wherein the predetermined range includes a range defined by a correlation between the parameter and disk balance or track mis-registration (TMR) characteristics.

(Structure 1-5)

The glass substrate for a magnetic disk as recited in any one of Structures 1-2 to 1-4, wherein the predetermined range includes a range defined by a correlation between a skewness and/or a kurtosis specifying a distribution of the difference and disk balance or track mis-registration (TMR) characteristics.

(Structure 1-6)

The glass substrate for a magnetic disk as recited in Structure 1-5, wherein the disk balance or the track mis-registration (TMR) characteristics are represented by an axial displacement 3 s.

(Structure 1-7)

The glass substrate for a magnetic disk as recited in Structure 1-6, wherein the predetermined range is a range between an upper limit and a lower limit of a flat portion of the skewness and/or the kurtosis in which the axial displacement 3 s is held at a constant value in a correlation diagram of the skewness and/or the kurtosis and the axial displacement 3 s.

(Structure 1-8)

A magnetic recording medium comprising: the glass substrate for a magnetic disk as recited in any one of Structures 1-1 to 1-7; and an underlayer, a magnetic layer, a protective layer, and a lubricating layer provided on a main surface of the glass substrate.

(Structure 1-9)

A method of evaluating a glass substrate for a magnetic disk with an inside hole formed therein, the method comprising: determining whether or not a parameter indicating an uneven distribution of irregularities of a profile of the inside hole in the glass substrate is within a predetermined range.

(Structure 1-10)

The method of evaluating a glass substrate for a magnetic disk as recited in Structure 1-9, wherein the parameter includes a difference in a radial direction between the profile of the inside hole and an inscribed circle of the profile with the smallest value in the profile of the inside hole or a least-square-approximated circle of the profile of the inside hole.

(Structure 1-11)

The method of evaluating a glass substrate for a magnetic disk as recited in Structure 1-10, wherein the difference is a difference between the profile of the inside hole and the inscribed circle or the least-square-approximated circle of the profile of the inside hole on a line drawn from a center of a circle calculated by a least-square approximation of the profile of the inside hole to the inscribed circle of the profile with the smallest value in the profile of the inside hole or the least-square-approximated circle of the profile of the inside hole.

(Structure 1-12)

The method of evaluating a glass substrate for a magnetic disk as recited in Structure 1-10 or 1-11, wherein the predetermined range includes a range defined by a correlation between the parameter and disk balance or track mis-registration (TMR) characteristics.

(Structure 1-13)

The method of evaluating a glass substrate for a magnetic disk as recited in any one of Structures 1-10 to 1-12, wherein the predetermined range includes a range defined by a correlation between a skewness and/or a kurtosis specifying a distribution of the difference and disk balance or track mis-registration (TMR) characteristics.

(Structure 1-14)

The method of evaluating a glass substrate for a magnetic disk as recited in Structure 1-13, wherein the disk balance or the track mis-registration (TMR) characteristics are represented by an axial displacement 3 s.

(Structure 1-15)

The method of evaluating a glass substrate for a magnetic disk as recited in Structure 1-14, wherein the predetermined range is a range between an upper limit and a lower limit of a flat portion of the skewness and/or the kurtosis in which the axial displacement 3 s is held at a constant value in a correlation diagram of the skewness and/or the kurtosis and the axial displacement 3 s.

(Structure 1-16)

A method of manufacturing a glass substrate for a magnetic disk, the method comprising: evaluating the glass substrate for a magnetic disk by the method as recited in any one of Structures 1-9 to 1-15.

Meanwhile, the inventor has diligently studied to solve the second problem. The inventor has focused on the fact that, according to the conventional definition, the concentricity is generally defined by a distance between centers of profiles averaged by using least-square-approximated circles, that variations of profiles of an inner circumference and an outer circumference are not taken into consideration by the conventional definition of the concentricity, and that relative unevenness of profiles is not taken into consideration.

Specifically, glass substrates are evaluated as having the same concentricity as long as they have the same least-square-approximated circle, whether or not winding (irregularities) of an inner circumference and an outer circumference is present unevenly at a specific portion or is present uniformly.

The inventor's further study has revealed that a causal relation between TMR and profiles of an inner circumference and an outer circumference can be obtained by using an index that has taken into consideration variations and relative unevenness of profiles of an inner circumference and an outer circumference, as well as a conventional index, for evaluating the concentricity of the profiles. Thus, the inventor has completed the second aspect of the present invention.

Specifically, the second aspect of the present invention has the following configuration in order to solve the second problem.

(Structure 2-1)

A glass substrate for a magnetic disk with an inside hole formed therein, wherein an evaluation value defined by parameters indicating uneven distributions of irregularities of a profile of an outer circumference and a profile of an inner circumference of the glass substrate and a difference between centers of the outer circumference and the inner circumference is within a predetermined range.

(Structure 2-2)

The glass substrate for a magnetic disk as recited in Structure 2-1, wherein the parameters include a difference in a radial direction between each of the profile of the outer circumference and the profile of the inner circumference and a least-square-approximated circle thereof.

(Structure 2-3)

The glass substrate for a magnetic disk as recited in Structure 2-2, wherein the difference in a radial direction is a difference between each of the profile of the outer circumference and the profile of the inner circumference and the least-square-approximated circle thereof on a line drawn from a center of the circle calculated by a least-square approximation of each of the profile of the outer circumference and the profile of the inner circumference to the least-square-approximated circle thereof.

(Structure 2-4)

The glass substrate for a magnetic disk as recited in any one of Structures 2-1 to 2-3, wherein the difference between centers is a difference between centers of circles calculated by a least-square approximation of the profile of the outer circumference and the profile of the inner circumference.

(Structure 2-5)

The glass substrate for a magnetic disk as recited in Structure 2-4, wherein the parameters include a skewness specifying a distribution of a histogram of the difference.

(Structure 2-6)

The glass substrate for a magnetic disk as recited in Structure 2-5, wherein the evaluation value is an amendment concentricity (AC) calculated by the following formulas (1) and (2):

$$AC = C\left(1 + \frac{Sk_{OD}}{Sk_{ID}}\right) \quad (1)$$

$$Sk_{OD(ID)} = \sum_{i=1}^{n} \frac{R_i^3}{n\sigma^3} \quad (2)$$

where $SK_{OD}$ is a skewness of the outer circumferential surface, $SK_{ID}$ is a skewness of the inner circumferential surface, $R_i$ is a difference, n is the number of samples, and $\sigma$ is a standard deviation.

(Structure 2-7)

The glass substrate for a magnetic disk as recited in Structure 2-6, wherein the predetermined range includes a range defined by a correlation between the evaluation value and disk balance or track mis-registration (TMR) characteristics.

(Structure 2-8)

The glass substrate for a magnetic disk as recited in Structure 2-7, wherein the predetermined range includes a range of an amendment concentricity in which an axial displacement 3 s has a predetermined value or less in a correlation diagram of the amendment concentricity and the axial displacement 3 s, which represents TMR characteristics.

(Structure 2-9)

A magnetic recording medium comprising: the glass substrate for a magnetic disk as recited in any one of Structures 2-1 to 2-8; and an underlayer, a magnetic layer, a protective layer, and a lubricating layer provided on a main surface of the glass substrate.

(Structure 2-10)

A method of evaluating a glass substrate for a magnetic disk with an inside hole formed therein, the method comprising: measuring a profile of an outer circumference and a profile of an inner circumference of the glass substrate; and determining whether or not an evaluation value defined by parameters indicating uneven distributions of irregularities of the profiles of the outer circumference and the inner circumference and a difference between centers of the outer circumference and the inner circumference is within a predetermined range.

(Structure 2-11)

The method of evaluating a glass substrate for a magnetic disk as recited in Structure 2-10, wherein the parameter includes a difference in a radial direction between each of the profile of the outer circumference and the profile of the inner circumference and a least-square-approximated circle thereof.

(Structure 2-12)

The method of evaluating a glass substrate for a magnetic disk as recited in Structure 2-11, wherein the difference in a radial direction is a difference between each of the profile of the outer circumference and the profile of the inner circumference and the least-square-approximated circle thereof on a line drawn from a center of the circle calculated by a least-square approximation of each of the profile of the outer circumference and the profile of the inner circumference to the least-square-approximated circle thereof.

(Structure 2-13)

The method of evaluating a glass substrate for a magnetic disk as recited in any one of Structures 2-10 to 2-12, wherein the difference between centers is a difference between centers of circles calculated by a least-square approximation of the profile of the outer circumference and the profile of the inner circumference.

(Structure 2-14)

The method of evaluating a glass substrate for a magnetic disk as recited in Structure 2-13, wherein the parameters include a skewness specifying a distribution of a histogram of the difference.

(Structure 2-15)

The method of evaluating a glass substrate for a magnetic disk as recited in Structure 2-14, wherein the evaluation value is an amendment concentricity (AC) calculated by the following formulas (1) and (2):

$$AC = C\left(1 + \frac{Sk_{OD}}{Sk_{ID}}\right) \quad (1)$$

$$Sk_{OD(ID)} = \sum_{i=1}^{n} \frac{R_i^3}{n\sigma^3} \quad (2)$$

where $SK_{OD}$ is a skewness of the outer circumferential surface, $SK_{ID}$ is a skewness of the inner circumferential surface, $R_i$ is a difference, n is the number of samples, and $\sigma$ is a standard deviation.

(Structure 2-16)

The method of evaluating a glass substrate for a magnetic disk as recited in Structure 2-15, wherein the predetermined range includes a range defined by a correlation between the evaluation value and disk balance or track mis-registration (TMR) characteristics.

(Structure 2-17)

The method of evaluating a glass substrate for a magnetic disk as recited in Structure 2-16, wherein the predetermined range includes a range of an amendment concentricity in which an axial displacement 3 s has a predetermined value or less in a correlation diagram of the amendment concentricity and the axial displacement 3 s, which represents TMR characteristics.

Furthermore, the inventor has diligently studied to solve the third problem. The inventor has focused on the fact that, according to the conventional definition, the thickness is a mere index representing a distance between both of main surfaces at one or more specific points and does not reflect a distribution of the thickness over the entire main surfaces.

Specifically, according to the conventional definition, glass substrates are evaluated as having the same thickness as long as the thickness is measured with the same value at measurement points even if there are variations or unevenness in thickness depending upon points on the main surfaces.

The inventor's further study has revealed that a causal relation between TMR and the thickness can be obtained by using an index that has taken into consideration a distribution of the thickness, particularly thickness information with respect to a radial position in a disk, for evaluating a thickness of a glass substrate. Thus, the inventor has completed the third aspect of the present invention.

Specifically, the third aspect of the present invention has the following configuration in order to solve the third problem.

(Structure 3-1)

A glass substrate for a magnetic disk, wherein a parameter calculated from a relationship between a radial position from a center of the glass substrate and a thickness at that position is within a predetermined range.

(Structure 3-2)

The glass substrate for a magnetic disk as recited in Structure 3-1, wherein the parameter has a value obtained by multiplying a radial position from the center and a thickness difference or a thickness at that position over a path of a disk.

(Structure 3-3)

The glass substrate for a magnetic disk as recited in Structure 3-2, wherein the glass substrate has an inside hole formed therein, and the parameter has a value calculated when a relationship between the radial position from the center and the thickness is obtained along a spiral path from the inside hole toward an outer circumference.

(Structure 3-4)

The glass substrate for a magnetic disk as recited in Structure 3-2 or 3-3, wherein the parameter is an M-value given by the following formulas (1) and (2):

$$M = \sum_{i=0}^{n} r_i^2 \Delta t_i \quad (1)$$

$$\Delta t_i = t_i - t_0 \quad (2)$$

where n is the number of samples, $r_i$ is a radius of a measurement point, $t_i$ is a thickness at the measurement point, and $t_0$ is a thickness at an initial measurement point (thickness of an inner circumferential edge).

(Structure 3-5)

The glass substrate for a magnetic disk as recited in Structure 3-2 or 3-3, wherein the parameter is an M-value given by the following formula (3):

$$M = \sum_{i=0}^{n} r_i^2 t_i \quad (3)$$

where n is the number of samples, $r_i$ is a radius of a measurement point, and $t_i$ is a thickness at the measurement point.

(Structure 3-6)

The glass substrate for a magnetic disk as recited in Structure 3-4 or 3-5, wherein the predetermined range includes a range defined by a correlation between the M-value and disk balance or track mis-registration (TMR) characteristics.

(Structure 3-7)

The glass substrate for a magnetic disk as recited in Structure 3-6, wherein the track mis-registration (TMR) characteristics include an axial displacement 3 s.

(Structure 3-8)

The glass substrate for a magnetic disk as recited in Structure 3-7, wherein the predetermined range is a range within an upper limit of the M-value in a flat portion in which the axial displacement 3 s is held at a constant value in a correlation diagram of the M-value and the axial displacement 3 s.

(Structure 3-9)

A magnetic recording medium comprising: the glass substrate for a magnetic disk as recited in any one of Structures 3-1 to 3-8; and an underlayer, a magnetic layer, a protective layer, and a lubricating layer provided on a main surface of the glass substrate.

(Structure 3-10)

A method of evaluating a glass substrate for a magnetic disk, the method comprising: determining whether or not a parameter calculated from a relationship between a radial position from a center of the glass substrate and a thickness is within a predetermined range.

(Structure 3-11)

The method of evaluating a glass substrate for a magnetic disk as recited in Structure 3-10, wherein the parameter has a value obtained by multiplying a radial position from the center and a thickness difference or a thickness at that radial position over a path of a disk.

(Structure 3-12)

The method of evaluating a glass substrate for a magnetic disk as recited in Structure 3-11, wherein the parameter has a value calculated when a relationship between the radial position from the center and the thickness is obtained along a spiral path from an inside hole of the glass substrate toward an outer circumference.

(Structure 3-13)

The method of evaluating a glass substrate for a magnetic disk as recited in Structure 3-11 or 3-12, wherein the parameter is an M-value given by the following formulas (1) and (2):

$$M = \sum_{i=0}^{n} r_i^2 \Delta t_i \quad (1)$$

$$\Delta t_i = t_i - t_0 \quad (2)$$

where n is the number of samples, $r_i$ is a radius of a measurement point, $t_i$ is a thickness at the measurement point, and $t_0$ is a thickness at an initial measurement point (thickness of an inner circumferential edge).

(Structure 3-14)

The method of evaluating a glass substrate for a magnetic disk as recited in Structure 3-11 or 3-12, wherein the parameter is an M-value given by the following formula (3):

$$M = \sum_{i=0}^{n} r_i^2 t_i \quad (3)$$

where n is the number of samples, $r_i$ is a radius of a measurement point, and $t_i$ is a thickness at the measurement point.

(Structure 3-15)

The method of evaluating a glass substrate for a magnetic disk as recited in Structure 3-13 or 3-14, wherein the predetermined range includes a range defined by a correlation between the M-value and disk balance or track mis-registration (TMR) characteristics.

(Structure 3-16)

The method of evaluating a glass substrate for a magnetic disk as recited in Structure 3-15, wherein the track misregistration (TMR) characteristics include an axial displacement 3 s.

(Structure 3-17)

The method of evaluating a glass substrate for a magnetic disk as recited in Structure 3-16, wherein the predetermined range is a range within an upper limit of the M-value in a flat portion in which the axial displacement 3 s is held at a constant value in a correlation diagram of the M-value and the axial displacement 3 s.

(Structure 3-18)

A method of manufacturing a glass substrate for a magnetic disk, the method comprising: evaluating the glass substrate for a magnetic disk by the method as recited in any one of Structures 3-10 to 3-17.

(Structure A)

For solving the first problem, there is provided a glass substrate for a magnetic disk with an inside hole formed therein, wherein a value of Sk calculated from a shape profile over a whole circumference of the inside hole is in a range of 0.55 to −0.55, and Sk is given by $$Sk = \sum_{i=1}^{n} \frac{R_i^3}{n\sigma^3} \quad (1)$$

where n is the number of samples, $R_i$ is an ith difference between the shape profile and a least-square-approximated circle of the shape profile on a line drawn to the least-square-approximated circle of the shape profile from a center of a circle calculated by a least-square approximation of the shape profile over the whole circumference of the inside hole, and σ is a standard deviation.

In other words, for solving the first problem, there is provided a glass substrate for a magnetic disk with an inside hole formed therein, wherein a value of Sk calculated from expansion of a shape profile over the whole circumference of the inside hole on the X-Y plane with a baseline of a least-square-approximated circle of the shape profile is in a range of 0.55 to −0.55, and Sk is given by $$Sk = \sum_{i=1}^{n} \frac{R_i^3}{n\sigma^3} \quad (1)$$

where n is the number of samples, $R_i$ is an ith difference (minimum) between the shape profile of the inside hole and the least-square-approximated circle of the shape profile, and σ is a standard deviation.

(Structure B)

More preferably, a value (Ku−3) obtained by subtracting 3 from Ku calculated from the shape profile over the whole circumference of the inside hole is in a range of 1.6 to −1.6, and Ku is given by $$Ku = \sum_{i=1}^{n} \frac{R_i^4}{n\sigma^4} \quad (3)$$

where n is the number of samples, $R_i$ is an ith difference between the shape profile and the least-square-approximated circle of the shape profile on a line drawn to the least-square-approximated circle of the shape profile from a center of a circle calculated by a least-square approximation of the shape profile of the inside hole, and σ is a standard deviation.

In other words, a value (Ku−3) obtained by subtracting 3 from Ku calculated from expansion of a shape profile over the whole circumference of the inside hole on the X-Y plane with a baseline of a least-square-approximated circle of the shape profile is preferably in a range of 1.6 to −1.6, and Ku is given by $$Ku = \sum_{i=1}^{n} \frac{R_i^4}{n\sigma^4} \quad (3)$$

where n is the number of samples, $R_i$ is an ith difference between the shape profile and the least-square-approximated circle of the shape profile on a line drawn to the least-square-approximated circle of the shape profile from a center of a circle calculated by a least-square approximation of the shape profile of the inside hole, and σ is a standard deviation.

(Structure C)

For solving the first problem, there is provided a glass substrate for a magnetic disk with an inside hole formed therein, wherein a value (Ku−3) obtained by subtracting 3 from Ku calculated from a shape profile over a whole circumference of the inside hole is in a range of 1.6 to −1.6, and Ku is given by $$Ku = \sum_{i=1}^{n} \frac{R_i^4}{n\sigma^4} \quad (2)$$

where n is the number of samples, $R_i$ is an ith difference between the shape profile and a least-square-approximated circle of the shape profile on a line drawn to the least-square-approximated circle of the shape profile from a center of a circle calculated by a least-square approximation of the shape profile of the inside hole, and σ is a standard deviation.

(Structure D)

Furthermore, in a preferable configuration of the glass substrate for a magnetic disk, a circularity is 5.5 μm or less.

(Structure E)

Moreover, in a preferable configuration of the glass substrate for a magnetic disk, the glass substrate is used for a magnetic disk having a storage capacity of at least 80 GBytes per one 2.5-inch disk.

(Structure F)

Furthermore, in a preferable configuration of the glass substrate for a magnetic disk, a value of AC calculated by using a value of $Sk_{ID}$ calculated from the shape profile over the whole circumference of the inside hole, a value of $Sk_{OD}$ calculated from a shape profile of an outer circumference of the glass substrate for a magnetic disk, and a value of a concentricity C is 9.6 μm or less, and AC is given by $$AC = C\left(1 + \frac{Sk_{OD}}{Sk_{ID}}\right) \quad (4)$$

$Sk_{ID}$ is given by $$Sk_{ID} = \sum_{i=1}^{n} \frac{R_i^3}{n\sigma^3} \quad (5)$$

where n is the number of samples, $R_i$ is an ith difference between the shape profile and a least-square-approximated circle of the shape profile on a line drawn to the least-square-approximated circle of the shape profile from a center of a circle calculated by a least-square approximation of the shape profile over the whole circumference of the inside hole, and $\sigma$ is a standard deviation, and $Sk_{OD}$ is given by $$Sk_{OD} = \sum_{i=1}^{n} \frac{R_i^3}{n\sigma^3} \quad (6)$$

where n is the number of samples, $R_i$ is an ith difference between the shape profile and a least-square-approximated circle of the shape profile on a line drawn to the least-square-approximated circle of the shape profile with the smallest value of the shape profile from a center of a circle calculated by a least-square approximation of the shape profile of the outer circumference, and $\sigma$ is a standard deviation.

(Structure G)

Moreover, in a preferable configuration of the glass substrate for a magnetic disk, an M-value calculated from a relationship between a radial position from a center of the glass substrate for a magnetic disk and a thickness at that radial position is within $20 \times 10^6$ mm$^3$, and the M-value is given by $$M = \sum_{i=0}^{n} r_i^2 \Delta t_i \quad (7)$$

$$\Delta t_i = t_i - t_0 \quad (8)$$

where n is the number of samples, $r_i$ is a radius of a measurement point, $t_i$ is a thickness at the measurement point, and $t_0$ is a thickness at an initial measurement point (thickness of an inner circumferential edge).

(Structure H)

For solving the second problem, there is provided a glass substrate for a magnetic disk, wherein a value of AC calculated by using a value of $Sk_{ID}$ calculated from the shape profile over the whole circumference of the inside hole, a value of $Sk_{OD}$ calculated from a shape profile of an outer circumference of the glass substrate for a magnetic disk, and a value of a concentricity C is 9.6 μm or less, AC is given by $$AC = C\left(1 + \frac{Sk_{OD}}{Sk_{ID}}\right) \quad (1)$$

$Sk_{ID}$ is given by $$Sk_{ID} = \sum_{i=1}^{n} \frac{R_i^3}{n\sigma^3} \quad (2)$$

where n is the number of samples, $R_i$ is an ith difference between the shape profile and a least-square-approximated circle of the shape profile on a line drawn to the least-square-approximated circle of the shape profile from a center of a circle calculated by a least-square approximation of the shape profile over the whole circumference of the inside hole, and $\sigma$ is a standard deviation, and $Sk_{OD}$ is given by $$Sk_{OD} = \sum_{i=1}^{n} \frac{R_i^3}{n\sigma^3} \quad (3)$$

where n is the number of samples, $R_i$ is an ith difference between the shape profile and a least-square-approximated circle of the shape profile on a line drawn to the least-square-approximated circle of the shape profile from a center of a circle calculated by a least-square approximation of the shape profile of the outer circumference, and $\sigma$ is a standard deviation.

(Structure I)

Furthermore, in a preferable configuration of the glass substrate for a magnetic disk, an M-value calculated from a relationship between a radial position from a center of the glass substrate for a magnetic disk and a thickness at that radial position is within $20 \times 10^6$ mm$^3$, the M-value is given by $$M = \sum_{i=0}^{n} r_i^2 \Delta t_i \quad (4)$$

$$\Delta t_i = t_i - t_0 \quad (5)$$

where n is the number of samples, $r_i$ is a radius of a measurement point, $t_i$ is a thickness at the measurement point, and $t_0$ is a thickness at an initial measurement point (thickness of an inner circumferential edge).

(Structure J)

Moreover, in a preferable configuration of the glass substrate for a magnetic disk, the concentricity C is 7 μm or less.

(Structure K)

Furthermore, in a preferable configuration of the glass substrate for a magnetic disk, the glass substrate is used for a magnetic disk having a storage capacity of at least 80 GBytes per one 2.5-inch disk.

(Structure L)

For solving the third problem, there is provided a glass substrate for a magnetic disk with an inside hole formed therein, wherein an M-value calculated from a relationship between a radial position from a center of the glass substrate for a magnetic disk and a thickness at that radial position is within $20 \times 10^6$ mm$^3$, and the M-value is given by $$M = \sum_{i=0}^{n} r_i^2 \Delta t_i \quad (1)$$

$$\Delta t_i = t_i - t_0 \quad (2)$$

where n is the number of samples, $r_i$ is a radius of a measurement point, $t_i$ is a thickness at the measurement point, and $t_0$ is a thickness at an initial measurement point (thickness of an inner circumferential edge).

(Structure M)

Furthermore, in a preferable configuration of the glass substrate for a magnetic disk, the glass substrate is used for a magnetic disk having a storage capacity of at least 80 GBytes per one 2.5-inch disk.

(Structure N)

Moreover, for solving one of the first, second, and third problems, there is provided a magnetic recording medium comprising: the aforementioned glass substrate for a magnetic disk; and an underlayer, a magnetic layer, a protective layer, and a lubricating layer provided on a main surface of the glass substrate.

Advantageous Effects of the Invention

According to the present invention, there can be provided a glass substrate for a magnetic recording medium that can stably read servo information including track information stored on a magnetic disk when the glass substrate is used for an HDD.

DETAILED DESCRIPTION OF THE EMBODIMENTS

First Embodiment

Figure 1A:
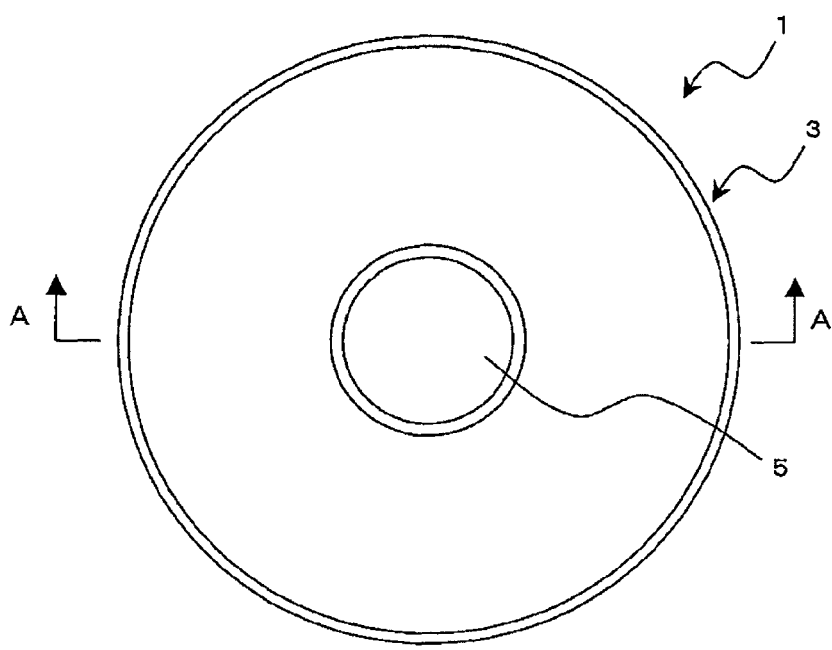
FIG. 1A is a plan view of a glass substrate 1.

A first embodiment of the present invention will be described below in detail with reference to FIGS. 1A to 9. The reference numerals illustrated in FIGS. 1A to 9 are used for explanation of the first embodiment. Similarly, the step numbers used in the first embodiment are used for explanation of the first embodiment.

Now a first embodiment of the present invention will be described below in detail.

First of all, a structure of a glass substrate 1 according to the first embodiment will briefly be described with reference to FIGS. 1A to 1C.

As shown in FIG. 1A, the glass substrate 1 has a body 3 having a disk-like shape. The body 3 has an inside hole 5 formed at the center thereof.

The shape of the inside hole 5 is configured such that a parameter indicating an uneven distribution of irregularities of a profile of the inside hole is within a predetermined range. The detail of this configuration will be described later.

Figure 1B:
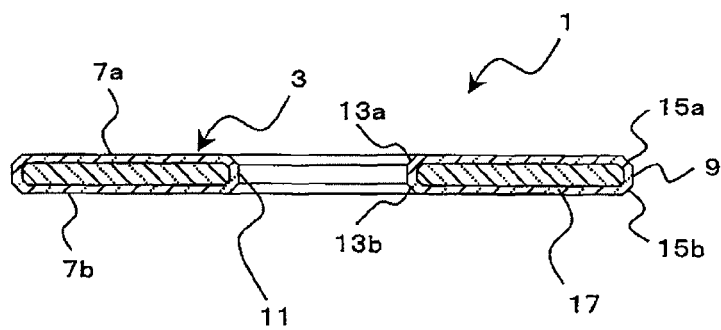
FIG. 1B is a cross-sectional view taken along line A-A of FIG. 1A.
Figure 1C:
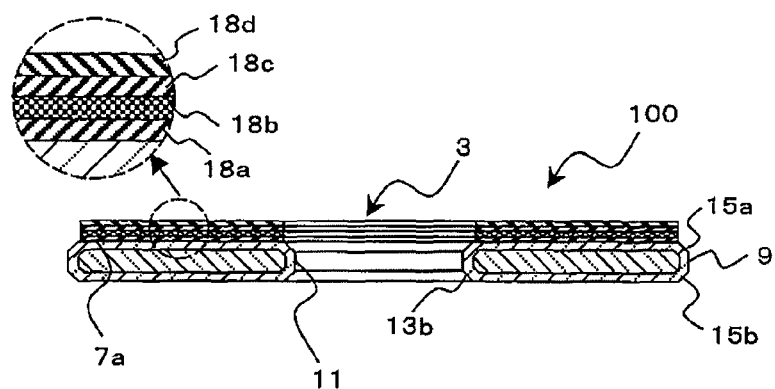
FIG. 1C is a cross-sectional view showing a magnetic recording medium 100.

As shown in FIG. 1B, the body 3 has main surfaces 7a and 7b that are substantially flat.

A layer for recording and reading information is formed on the main surfaces 7a and 7b. For example, as shown in FIG. 1C, an underlayer 18a, a magnetic layer 18b, a protective layer 18c, and a lubricating layer 18d are provided on one or both of the main surfaces 7a and 7b to thereby form a magnetic recording medium 100 along with the glass substrate 1. At least the magnetic layer 18b is required as a recording layer.

Furthermore, as shown in FIG. 1B, the body 3 has an inner circumferential surface 11 and an outer circumferential surface 9, which are perpendicular to the main surfaces 7a and 7b.

The inner circumferential surface 11 and the outer circumferential surface 9 are chamfered so as to have inner chamfered surfaces 13 and outer chamfered surfaces 15, respectively.

Furthermore, a chemical strengthening layer 17 is formed on the surfaces of the body 3.

For example, the chemical strengthening layer 17 is a compressive stress layer in which part of ions of glass as a material of the glass substrate 1 has been replaced with ions having a larger ionic radius. The detail of the chemical strengthening layer 17 will be described later.

Next, a method of manufacturing a glass substrate 1 will be described with reference to FIG. 1A to 2.

In the following description, glass in a manufacturing process is referred to as a "glass base material 1*a*," and a finished product is referred to as a "glass substrate 1."

Figure 2:
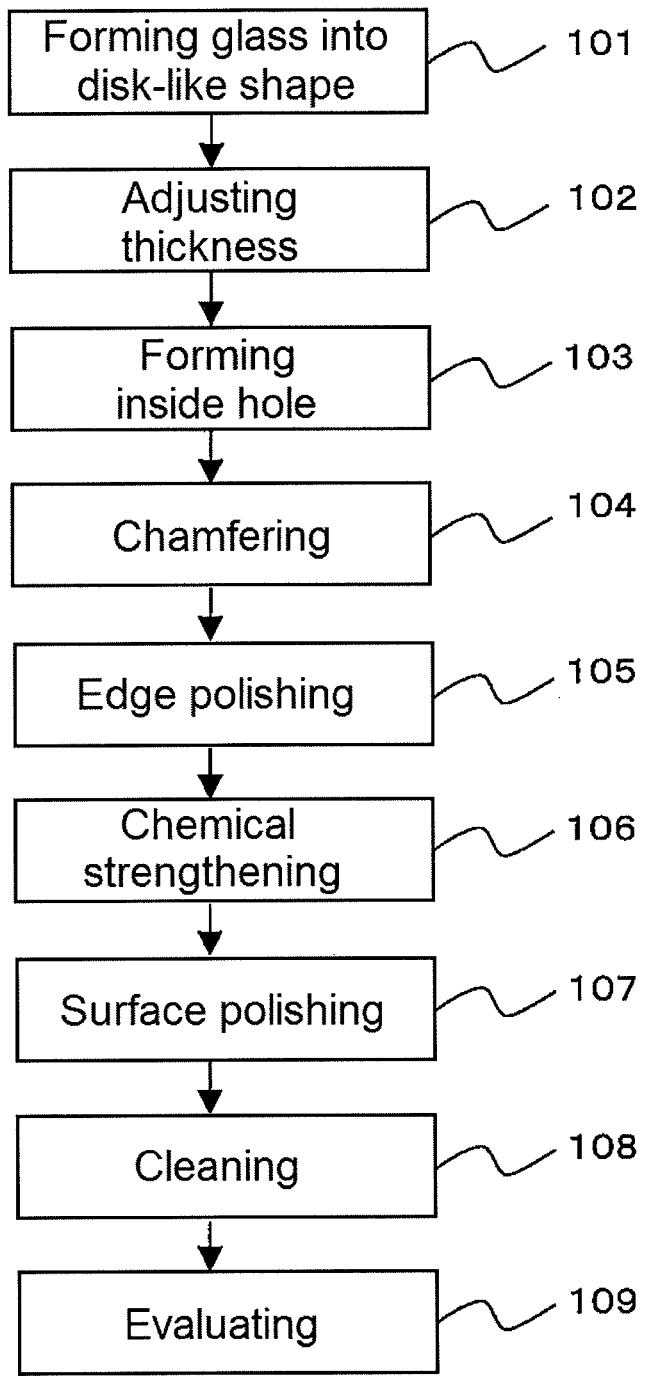
FIG. 2 is a flow chart showing the detail of a manufacturing method of a glass substrate 1.

First, as shown in FIG. 2, material glass is formed into a disk-like shape to produce a glass base material 1*a* (Step 101).

Examples of the material glass include soda-lime glass, aluminosilicate glass, borosilicate glass, and crystallized glass produced by, for example, a float method, a down-draw method, a redraw method, or a press method.

An example of the crystallized glass has the following composition defined by weight percentage based upon an oxide: $SiO_2$ is in a range of 45.60% to 60%. $Al_2O_3$ is in a range of 7% to 20%. $B_2O_3$ is in a range of 1.00% to less than 8%. $P_2O_5$ is in a range of 0.50% to 7%. $TiO_2$ is in a range of 1% to 15%. The sum of RO is in a range of 5% to 35% where R is each of Zn and Mg. The content of CaO is 3.00% or less. The content of BaO is 4% or less. The crystallized glass does not contain any PbO component, $As_2O_3$ component, $Sb_2O_3$ component, Cl-component, NO-component, $SO_2$-component, or F-component. The crystallized glass contains, as a primary crystal phase, at least one type selected from $RAl_2O_4$ and $R_2TiO_4$ where R is at least one of Zn and Mg. The crystal particle diameter of the primary crystal phase is in a range of 0.5 nm to 20 nm. The degree of crystallinity is 15% or less. The specific gravity is 2.95 or less. The crystallized glass preferably has a Young's modulus of 90 GPa or more, and more preferably 100 GPa or more. This is because the flattering can be suppressed more effectively when a glass substrate 1 having a Young's modulus in the aforementioned range is used to produce a magnetic recording medium 100 shown in FIG. 1C.

In the following description, glass produced by a press method will be described by way of example.

Subsequently, main surfaces 7*a* and 7*b* are ground with a grinder (first lapping) for adjusting the flatness and thickness of the glass base material 1*a* (Step 102).

For example, the grinding is conducted with a double-sided lapping device and abrasive particles such as alumina.

Then, as shown in FIG. 2, an inside hole 5 (see FIG. 1A) is formed at the center of the glass base material 1*a* (Step 103).

The inside hole 5 is formed by, for example, using a core drill.

If sheet glass is used, Steps 101 and 103 are not carried out. Instead, glass is cut into a disk-like shape including an inside hole from the sheet with use of a cutter (scribing step).

Next, as shown in FIG. 2, an inner circumferential surface 11 and an outer circumferential surface 9 are chamfered, and an inside diameter of the inside hole is adjusted (Step 104). The inner circumferential surface 11 and the outer circumferential surface 9 are chamfered with use of a grindstone having diamond abrasive particles fixed thereon.

A step of grinding the main surfaces 7*a* and 7*b* (second lapping) may be added after the chamfering. With this step, irregularities of the main surfaces that have been produced by the formation of the inside hole 5 or the chamfering can be ground so that a load on polishing can be reduced.

Subsequently, as shown in FIG. 2, a polishing step of the inner circumferential surface 11 and the outer circumferential surface 9 of the glass base material 1*a* (edge polishing) is carried out (Step 105).

Step 105 will be described later.

Then, as shown in FIG. 2, a chemical strengthening treatment is performed on the glass base material 1*a* to form a chemical strengthening layer 17 on the glass base material 1*a* (Step 106).

Specifically, the glass is immersed in a chemical strengthening liquid so that ions contained in the chemical strengthening liquid that have an ionic radius larger than ionic radii of ions contained in the glass are ion-exchanged with the ions contained in the glass. Thus, a chemical strengthening layer 17 is formed.

After the chemical strengthening, the glass base material 1*a* is cleaned so that the chemical strengthening liquid is removed from the surfaces of the glass base material 1*a*. Thereafter, as shown in FIG. 2, the main surfaces 7*a* and 7*b* of the glass base material 1*a* are polished in order to adjust (substantially smoothen) the surface roughness of the main surfaces 7*a* and 7*b* (Step 107).

The polishing is conducted with, for example, a double-sided polishing device and a hard resin polisher by using a planetary gear mechanism. For example, slurry in which abrasive particles of cerium oxide, lanthanum oxide, or the like have been dispersed in water is used as a polishing liquid.

After the polishing, the glass base material 1*a* is cleaned so that abrasives and impurities attached to the surfaces of the glass base material 1*a* during the manufacturing process are removed (Step 108).

Specific examples of the cleaning process include physical cleaning such as scrubbing cleaning or ultrasonic cleaning, and chemical liquid cleaning using fluoride, organic acid, hydrogen peroxide, surface-active agent, or the like.

In this example, Step 104 (chamfering step) and, especially, Step 105 (edge polishing step) of Steps 101-108 are likely to produce variations in shape profile of the inside hole, which exert influence on the disk shape balance/TMR characteristics on which the inventor has focused attention. In Step 104, for example, a good shape profile can be obtained by (1) alignment of a central position or a vertical position of a grindstone of diamond abrasive particles for inner and outer circumferences when the diamond abrasive particles are attached to the apparatus or (2) equalization of pressing forces of the diamond abrasive particles against a workpiece (reduction of partial unbalanced contact). Furthermore, in Step 105, a good shape profile can be obtained by (1) equalization of pressing forces of a polishing brush against a workpiece or (2) processing under such conditions that pressing forces of the polishing brush against the workpiece are held constant irrespective of a stacked location of the workpiece in a stacking case where workpieces are processed while those workpieces are stacked. Nevertheless, it is more preferable to carry out Step 105 in the following manner.

In Step 105, it is more preferable to carry out a polishing step of the inner circumferential surface as follows: The inner circumferential surface 11 of the glass base material 1*a* is edge-polished with use of a rotary brush. Additionally, an inner circumference polishing unit having a rotation axis and a plurality of polishing clothes arranged around the rotation axis is brought into contact with the inner circumferential surface 11 of the glass base material 1*a* under equal pressures. A polishing liquid is supplied to between the inner circumferential surface 11 of the glass base material 1*a* and the inner circumference polishing unit. The inner circumference polishing unit and the glass base material 1*a* are rotated about the rotation axis relative to each other or moved along the rotation axis relative to each other to thus polish the inner circumferential surface 11 of the glass base material 1*a*.

With the above polishing step of the inner circumferential surface, the polishing clothes can be pressed with surface contact against the whole inner circumferential surface 11 of the glass base material 1*a* under equal pressing forces. Therefore, the roughness of the chamfered surfaces and the inner circumferential surface 11 of the glass base material 1*a* can be lowered. At the same time, a favorable shape profile that can improve the TMR characteristics can be obtained. In order to obtain the aforementioned good shape profile, it is more preferable to rotate both of the inner circumference polishing unit having the rotation axis and the glass substrate 1a in opposite directions for polishing and to set a ratio of a rotational speed of the inner circumference polishing unit and a rotational speed of the glass substrate 1a (a rotational speed of the inner circumference polishing unit/a rotational speed of glass substrate 1a) within a range of 1.5 to 5.0. Additionally, in order to obtain the aforementioned good shape profile, it is more preferable to set a machining allowance of the inner circumferential surface 11 for the polishing step of the inner circumferential surface to be 10% or less of the inside diameter, more preferably 1% or less of the inside diameter, more preferably 0.1% or less of the inside diameter, and more preferably 0.05% or less of the inside diameter.

Finally, a product inspection (inspection of the circularity) is performed (Step 109).

Now the detail of Step 109 will be described with reference to FIGS. 3 to 8.

As described above, the glass substrate 1 is formed such that a parameter indicating an uneven distribution of irregularities of the profile of the inside hole 5 is within a predetermined range. In order to evaluate such a parameter, the profile of the inside hole 5 is measured so as to obtain the parameter. Then whether or not the parameter is within the predetermined range is determined.

Specifically, an inspection is performed in the following manner.

Figure 3:
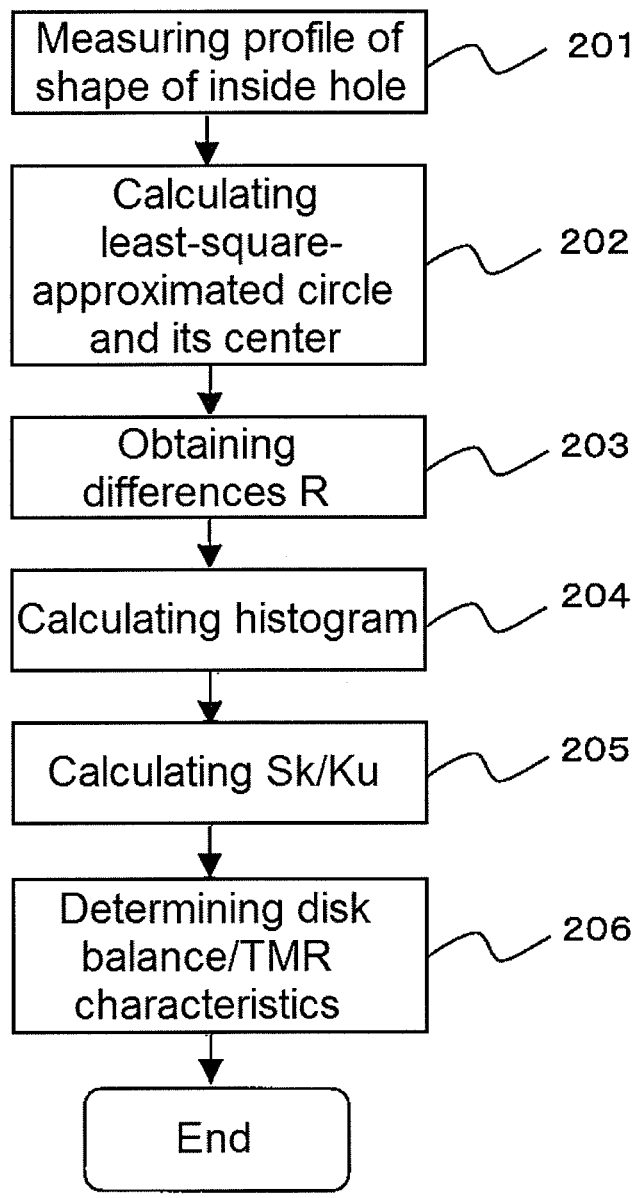
FIG. 3 is a flow chart showing the detail of Step 109 in FIG. 2.

First, as shown in FIG. 3, the shape of the inside hole 5 of the glass substrate 1 (the inner circumferential surface 11 of the inside hole 5) is measured with a known circularity/concentricity measurement device or the like. Thus, a shape profile of the inside hole 5 is generated (Step 201).

Figure 4A:
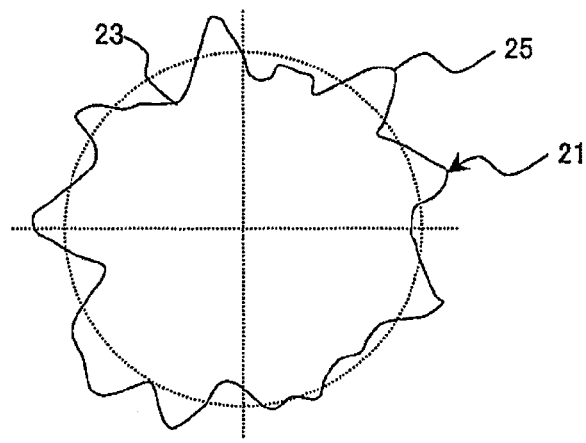
FIGS. 4A to 4C are diagrams explanatory of Step 109 in FIG. 2.

FIG. 4A shows an example of the generated profile. For reference, in FIG. 4A, a designed dimension of the inside hole 5 is indicated by a dotted circle, and the position of the center of the inside hole 5 is indicated by dotted lines.

In FIG. 4A, irregularities of a surface of a profile 21 are enlarged at a certain magnification. As shown in FIG. 4A, there are recessed portions (depressions 23) and projecting portions (protrusions 25).

Then, as shown in FIG. 3, a least-square-approximated circle of the generated profile and its center are calculated (Step 202).

Figure 4B:
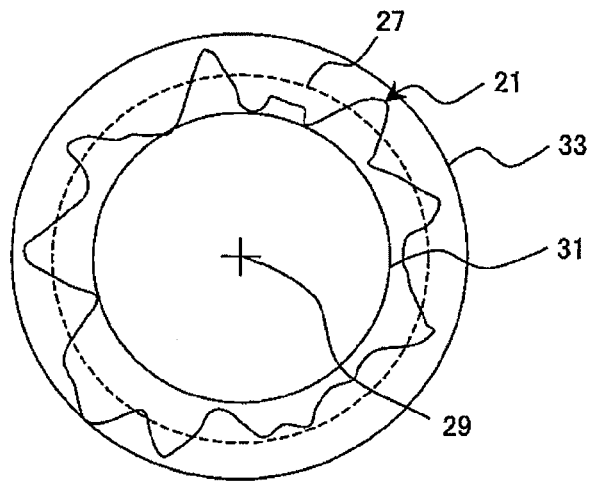

FIG. 4B illustrates an example of Step 202.

FIG. 4B shows a least-square-approximated circle 27 and its center 29. For reference, FIG. 4B also shows an inscribed circle 31 passing through the innermost point of the profile (the most recessed point) and a circumscribed circle 33 passing through the outermost point of the profile (the most projecting point).

Subsequently, as shown in FIG. 3, a line (perpendicular line) is dropped to the inscribed circle 31 from the center 29 of the least-square-approximated circle 27. A distance between the inscribed circle 31 and the profile 21 on the line is obtained as a difference R (Step 203).

Figure 4C:
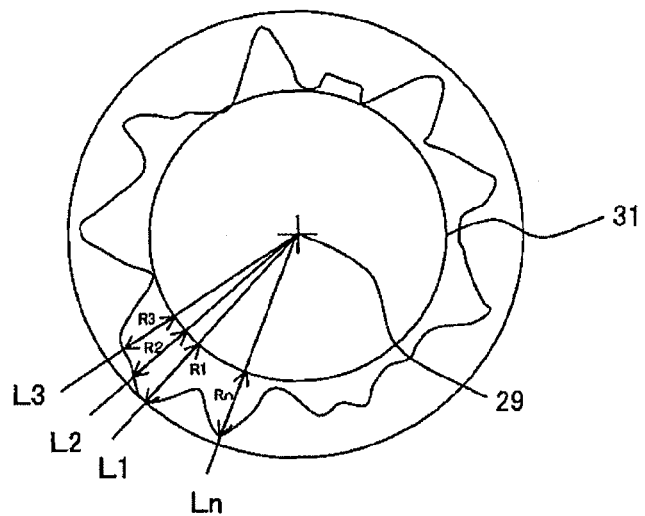

FIG. 4C illustrates an example of Step 203.

As shown in FIG. 4C, n lines corresponding to a desired number of samples are drawn as shown by lines L1, L2, ..., Ln, and n differences corresponding to the number of samples are obtained as shown by differences R1, R2, ..., Rn.

The number of samples and intervals (angles) between the lines may be set in any desired manner.

In FIG. 4C, a difference R is defined by a distance between the inscribed circle 31 and the profile 21. Nevertheless, as shown in FIG. 13C, a difference R may be defined by a distance between the least-square-approximated circle 27 and the profile 21. The following description assumes that a difference R is defined by a distance between the least-square-approximated circle 27 and the profile 21.

It is assumed that a difference R has a positive value when a measurement point of the profile is located outside of the least-square-approximated circle 27.

Then a histogram of the differences R is generated (Step 204).

Figure 5:
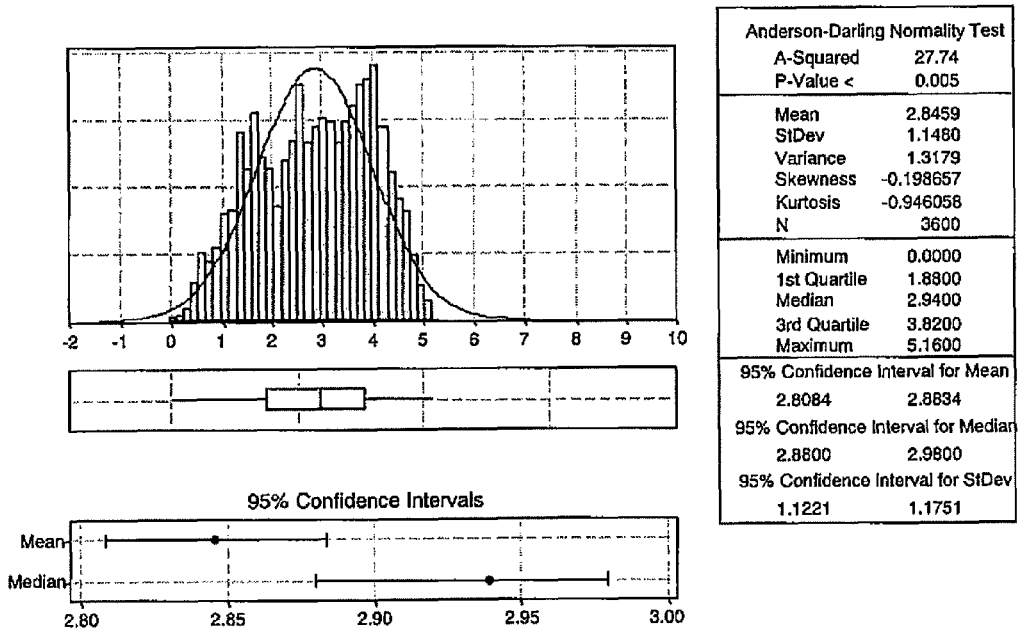
FIG. 5 is a diagram explanatory of Step 109 in FIG. 2.
Figure 6:
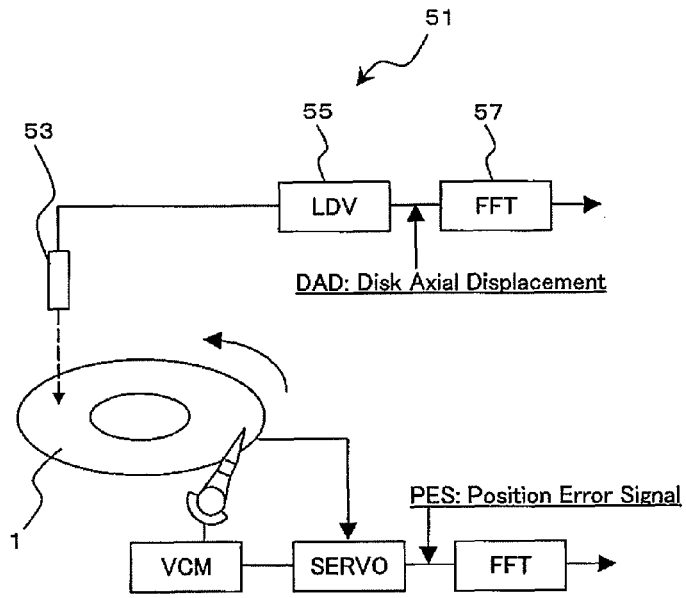
FIG. 6 is a conceptual diagram showing a measurement system 51 for TMR characteristics (axial displacement 3 s)

Specifically, for example, a histogram of values of the differences R and the number of sampling points with those values is generated as shown in FIG. 5.

Next, as shown in FIG. 3, a skewness (Sk) and a kurtosis (Ku) are calculated based upon the distribution of the histogram. More specifically, a skewness and a kurtosis are calculated by using the following formulas (1) and (2) (Step 205).

$$Sk = \sum_{i=1}^{n} \frac{R_i^3}{n\sigma^3} \quad (1)$$

$$Ku = \sum_{i=1}^{n} \frac{R_i^4}{n\sigma^4} \quad (2)$$

In the formulas (1) and (2), n is the number of samples, $R_i$ is a difference at each sampling point, and $\sigma$ is a standard deviation. As is apparent from the formula (2), the minimum value of Ku is zero because Ku uses the fourth power of $\sigma$ and the fourth power of $R_i$. Nevertheless, as shown in FIG. 8, a value (Ku−3) obtained by subtracting 3 from the formula (2), which has the minimum value of −3, may be used.

Subsequently, as shown in FIG. 3, whether or not the disk balance/TMR characteristics of the glass substrate 1 are within a predetermined range is determined from a correlation between the skewness/kurtosis and the disk balance/TMR characteristics. If the disk balance/TMR characteristics of the glass substrate 1 are within the predetermined range, then the glass substrate 1 is regarded as a non-defective product. Otherwise, the glass substrate 1 is regarded as a defective product (Step 206).

Figure 7:
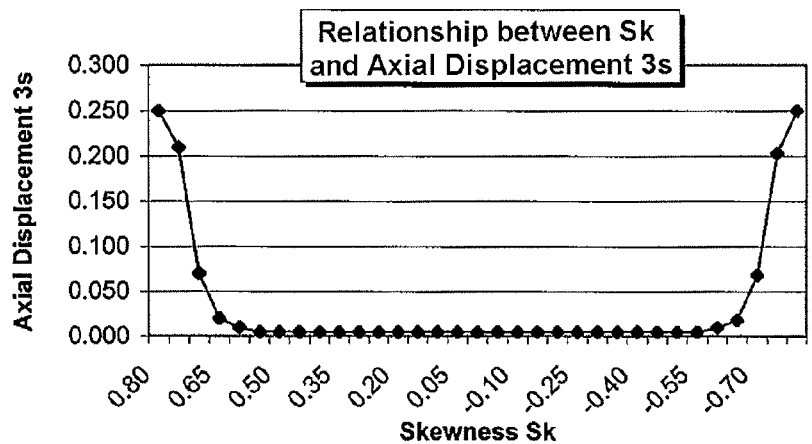
FIG. 7 is a correlation diagram of a skewness (Sk) and an axial displacement 3 s.
Figure 8:
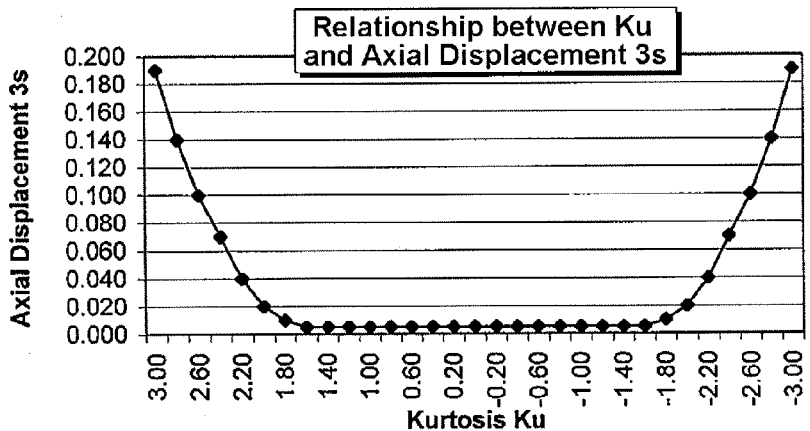
FIG. 8 is a correlation diagram of a value (Ku–3) obtained by subtracting 3 from a kurtosis (Ku) and an axial displacement 3 s.

Specifically, whether or not the skewness/kurtosis is within the predetermined range is determined from the relationship between the skewness/kurtosis and the axial displacement 3 s as shown in FIGS. 7 and 8. More specifically, whether or not a value of the skewness/kurtosis is between an upper limit and a lower limit of a flat portion in which the axial displacement is held constant in FIGS. 7 and 8 is determined. If the value is within the range, the glass substrate 1 is regarded as a non-defective product. Otherwise, the glass substrate 1 is regarded as a defective product.

The axial displacement 3 s is a track positioning error of an average +3 s calculated by integrating substrate vibration measurement data (vibration waveforms) for each rotational speed and for each frequency. For example, 3 s and $s^2$ are calculated by the following formulas (3) and (4).

$$3s = 3\sqrt{\int_0^f PSD_{PES}(f)df} \quad (3)$$

$$s^2 = \int_0^f PSD_{DAD}(f)df \quad (4)$$

In the formulas (3) and (4), PSD is an energy spectral density, PES is a position error signal, and DAD is a disk axial displacement.

Thus, with use of the skewness/kurtosis, the disk balance/ TMR characteristics can be evaluated in consideration of the positional dependency of the depressions or the protrusions of the shape profile.

Now there will briefly be described a method of obtaining the relationship between the skewness/kurtosis and the axial displacement 3 s as shown in FIGS. 7 and 8.

First, a predetermined number of glass substrates 1 to be inspected are produced, and the skewness/kurtosis of those glass substrates 1 is obtained.

Next, a magnetic layer 18b, a protective layer 18c, and a lubricating layer 18d are provided on a surface of each of the glass substrates 1. Thus, magnetic recording media 100 are produced. With use of a measurement system 51 shown in FIG. 6, the axial displacement 3 s is obtained at a certain rotational speed and a certain measurement point.

The measurement system 51 will briefly be described. The measurement system 51 has a laser Doppler velocimeter (LDV) 55 with a head 53 and a converter 57 for performing a fast Fourier transform (FFT) on data measured by the laser Doppler velocimeter 55.

Then the skewness and/or the kurtosis and the axial displacement 3 s, which represents the disk balance/TMR characteristics, are plotted so as to generate a correlation diagram as shown in FIG. 7 or 8.

The above is the detail of Step 109.

Thus, according to the first embodiment, the glass substrate 1 is configured such that the parameter (the skewness and/or the kurtosis) indicating an uneven distribution of irregularities of the profile of the inside hole 5 is within the predetermined range (meeting the requirements for the disk balance/ TMR characteristics).

Therefore, servo information including track information being stored can stably be read from a magnetic disk when the glass substrate 1 is used for an HDD.

Next, the inside hole of the glass substrate 1 according to the first embodiment will be described in detail.

When the shape profile of the inner circumferential surface 11 of the glass substrate 1 according to the first embodiment is obtained and analyzed, the skewness (Sk) expressed by the aforementioned formula (1) is preferably in a range of 0.55 to −0.55, more preferably 0.35 to −0.35, and more preferably 0.20 to −0.20. Within such a range, the glass substrate 1 can be used for a magnetic disk that can achieve good TMR characteristics. In a case where the glass substrate 1 for a magnetic disk is used to produce an HDD drive for reading and writing information, reading and writing operations of information may be inhibited by external impact. Even in such a situation, good TMR characteristics can be exhibited if the skewness (Sk) is in a range of 0.35 to −0.35.

When the shape profile of the inner circumferential surface 11 of the glass substrate 1 according to the first embodiment is obtained and analyzed, as shown in FIG. 8, a value (Ku−3) obtained by subtracting 3 from the kurtosis (Ku) expressed by the aforementioned formula (2) is preferably in a range of 1.6 to −1.6, more preferably 1.0 to −1.0, and more preferably 0.5 to −0.5. The value (Ku−3) has a minimum value at −3. Within such a range, the glass substrate 1 can be used for a magnetic disk that can achieve good TMR characteristics. In a case where the glass substrate 1 for a magnetic disk is used to produce an HDD drive for reading and writing information, reading and writing operations of information may be inhibited by external impact. Even in such a situation, good TMR characteristics can be exhibited if the value (Ku−3) obtained by subtracting 3 from the kurtosis (Ku) is in a range of 1.0 to −1.0.

The glass substrate 1 according to the first embodiment preferably meets at least one of a condition that the skewness (Sk) is in a range of 0.55 to −0.55 and a condition that the value (Ku−3) obtained by subtracting 3 from the kurtosis (Ku) is in a range of 1.6 to −1.6. Particularly, it is preferable for the glass substrate 1 according to the first embodiment to meet both of those conditions. When the skewness (Sk) or the value (Ku−3) obtained by subtracting 3 from the kurtosis (Ku) is within the aforementioned range, the glass substrate 1 can be used for a magnetic disk that can achieve good TMR characteristics. Additionally, if the skewness (Sk) and the value (Ku−3) obtained by subtracting 3 from the kurtosis (Ku) are within the aforementioned ranges, respectively, the glass substrate 1 can be used for a magnetic disk that can exhibit more favorable TMR characteristics.

Furthermore, the circularity of the glass substrate 1 according to the first embodiment is preferably 5.5 μm or less, more preferably 5 μm or less, and more preferably 3 μm or less. Generally, a glass substrate 1 having a favorable circularity (e.g., a circularity of 5.5 μm or less) tends to exhibit more favorable TMR characteristics as compared to a glass substrate 1 having an unfavorable circularity (e.g., a circularity of 10 μm). Nevertheless, some of glass substrates having the same circularity may exhibit good TMR characteristics, and others may not. Therefore, when a glass substrate 1 has an inside hole with a shape profile having a circularity in the aforementioned range and also having a skewness and/or a kurtosis in the aforementioned range, the glass substrate 1 can be used for a magnetic disk that can exhibit more favorable TMR characteristics.

Moreover, a ratio of the height of the inner circumferential surface 11 to the thickness of the glass substrate 1 for a magnetic disk according to the present invention is preferably at least 55%, more preferably at least 60%, and more preferably at least 65%. If chamfered surfaces are not sufficiently ensured, chipping is likely to occur. Therefore, the upper limit of the ratio of the height of the inner circumferential surface 11 to the thickness of the glass substrate 1 is preferably set to be 90% or less. With the inner circumferential surface 11 having a height within the aforementioned range and also having a skewness and/or a kurtosis in the aforementioned range, the TMR characteristics can further be enhanced.

A glass substrate for a magnetic disk according to the present invention preferably copes with a magnetic disk having a storage capacity of at least 80 GBytes per one 2.5-inch disk (where the track density (TPI) is in a range of 120 kTPI to 160 kTPI), more preferably at least 160 GBytes (180 kTPI to 220 kTPI), more preferably at least 320 GBytes (280 kTPI to 320 kTPI), and more preferably at least 500 GBytes (380 kTPI to 420 kTPI). Among others, a magnetic disk with a storage capacity of at least 320 GBytes has an extremely small track width. Therefore, if a glass substrate 1 that copes with a magnetic disk having a storage capacity of at least 320 GBytes does not exhibit good TMR characteristics, then errors are often generated in a reading or writing operation of information. Accordingly, use of a glass substrate for a magnetic disk according to the first embodiment, i.e., use of a glass substrate 1 having a skewness and/or a kurtosis in the aforementioned range can provide a magnetic disk that can satisfactorily perform a reading or writing operation of information.

Furthermore, a glass substrate for a magnetic disk according to the present invention is preferably used for a magnetic disk compatible with a magnetic head of a dynamic flying height (DFH) control head. In a dynamic flying height (DFH) control head, a distance between a head and a disk is much smaller than that in a case of a conventional magnetic head. Therefore, the magnetic disk and the magnetic head are likely to collide with each other. Thus, in order to hold a distance between the magnetic disk and the DFH control head constant, it is necessary to improve the fluttering characteristics of the glass substrate 1 for a magnetic disk on which a magnetic film has been deposited. Since the glass substrate 1 of the first embodiment has a skewness and/or a kurtosis in the aforementioned range, the fluttering characteristics of the glass substrate 1 can further be improved as compared to a conventional glass substrate. Accordingly, the glass substrate 1 of the first embodiment can suitably be used for a magnetic disk compatible with a DFH control head.

Moreover, a glass substrate for a magnetic disk according to the present invention is preferably used for a magnetic disk rotated at a rotational speed of at least 5,400 rpm, more preferably at least 7,200 rpm, and more preferably at least 10,000 rpm. Particularly, because a magnetic disk is rotated at a high speed in a server, more favorable TMR characteristics are required for such a magnetic disk. Since the glass substrate 1 of the first embodiment can exhibit favorable TMR characteristics as described above, it can suitably be used for a magnetic disk used for a server.

Furthermore, a glass substrate for a magnetic disk according to the present invention is preferably used in a hard disk drive having a plurality of magnetic disks mounted thereon with a magnetic film deposited on a glass substrate. In a case of a hard disk drive having a plurality of magnetic disks mounted thereon, if the magnetic disks are mounted into a spindle at deviated positions of the magnetic disks, the TMR characteristics are likely to change between the magnetic disks. Use of a glass substrate for a magnetic disk according to the first embodiment can prevent such a problem.

Moreover, the Young's modulus of a glass substrate for a magnetic disk according to the present invention is preferably at least 75 GPa, more preferably at least 80 GPa, and more preferably at least 85 GPa. The TMR characteristics can be improved with a glass substrate having a Young's modulus in the aforementioned range. Furthermore, more favorable TMR characteristics can be obtained with an inside hole having a skewness (Sk) and a value (Ku–3) obtained by subtracting 3 from a kurtosis (Ku) in the aforementioned ranges.

Furthermore, the thermal expansion coefficient of a glass substrate for a magnetic disk according to the present invention is preferably at least $60 \times 10^{-7}/°$ C., and more preferably $70 \times 10^{-7}/°$ C. under temperatures of 100° C. to 300° C. On the other hand, the upper limit of the thermal expansion coefficient is preferably $90 \times 10^{-7}/°$ C. or less. When the thermal expansion coefficient of the glass substrate is within the aforementioned range, it can be brought close to the thermal expansion coefficient of stainless as a material for a spindle, so that the TMR characteristics can be improved. Furthermore, with an inside hole having a skewness (Sk) and a value (Ku–3) obtained by subtracting 3 from a kurtosis (Ku) in the aforementioned ranges, more favorable TMR characteristics can be obtained.

Example 1

The first embodiment will be described in greater detail based upon some examples. The following examples and comparative examples are provided for explaining the first embodiment.

Glass substrates for a magnetic disk having an outside diameter of 65 mm and a thickness of 0.635 mmt were produced in the following manner. The shapes of inside holes of the glass substrates were measured, and the correlation between the shapes of the inside holes and the disk balance/TMR characteristics was obtained.

First, 100 glass substrates 1 were produced in the following manner.

(1) Shaping Step and First Lapping Step

In a method of manufacturing a glass substrate for a magnetic disk according to this example, a surface of a glass plate is lapped (ground) into a glass base material. A glass disk is cut out of the glass base material. Various glass plates may be used for the glass plate described above. For example, the glass plate may be produced from molten glass by known methods such as a press method, a float method, a down-draw method, a redraw method, and a fusion method. Among others, a press method can produce a glass plate inexpensively.

In this example, molten aluminosilicate glass was shaped into a disk by direct press using an upper mold, a lower mold, and a shell mold. Thus, an amorphous glass plate was obtained. The aluminosilicate glass primarily contained $SiO_2$ of 58 weight % to 75 weight %, $Al_2O_3$ of 5 weight % to 23 weight %, $Li_2O$ of 3 weight % to 10 weight %, and $Na_2O$ of 4 weight % to 13 weight %.

Then both of main surfaces of the glass plate were subjected to a lapping process. Thus, a disk-like glass base material was formed. The lapping step was carried out with free alumina-based abrasive particles by a double-sided lapping device using a planetary gear mechanism. Specifically, lapping surface plates were pressed upon both surfaces of the glass plate from an upper side and a lower side of the glass plate. A grinding liquid including free abrasive particles was supplied onto the surfaces of the glass plate. The lapping surface plates and the glass plate were moved relative to each other. Thus, a lapping step was carried out. A glass base material having flat main surfaces was obtained by the lapping step.

(2) Cutting Step (Coring and Chamfering)

Next, an inside hole was formed at a central portion of the glass substrate with a cylindrical diamond drill. Thus, an annular glass substrate was formed (coring). Then an inner circumferential surface and an outer circumferential surface of the glass substrate were ground with diamond grindstone. Thus, a chamfering process was performed (chamfering).

(3) Second Lapping Step

Thereafter, a second lapping step was carried out on both of main surfaces of the obtained glass substrate as with the first lapping step. The second lapping step can remove fine irregularities formed on the main surfaces during the previous steps of the cutting step and the edge polishing step. Therefore, a subsequent polishing step for the main surfaces can be completed in a short period of time.

(4) Edge Polishing Step

Then the outer circumferential surface and the inner circumferential surface of the glass substrate were mirror-polished by a brush polishing method. At that time, slurry (free abrasive particles) containing cerium oxide abrasive particles was used as abrasive particles for polishing. Then the glass substrate subjected to the edge polishing step was cleaned with water. With this edge polishing step, the edges of the glass substrate were formed into a mirror finish, which could prevent deposition of sodium and potassium. Next, an inner circumference polishing unit having a rotation axis and a plurality of polishing clothes (hard polishing pads) arranged around the rotation axis was brought into contact with the inner circumferential surface of the glass base material under equal pressures. A polishing liquid is supplied to between the inner circumferential surface 11 of the glass base material 1a and the inner circumference polishing unit. Slurry (free abrasive particles) containing cerium oxide abrasive particles was supplied to between the inner circumferential surface of the glass base material and the inner circumference polishing unit. The inner circumference polishing unit and the glass base material 1a were rotated about the rotation axis relative to each other or moved along the rotation axis relative to each other to thus polish the inner circumferential surface of the glass base material.

(5) Main Surface Polishing Step (First Polishing Step)

A first polishing step was carried out as a main surface polishing step. The first polishing step is carried out primarily for removing scratches or distortions remaining on the main surfaces after the aforementioned lapping step. In the first polishing step, the main surfaces were polished with hard resin polishers by a double-sided polishing device having a planetary gear mechanism. Cerium oxide abrasive particles were used as an abrasive.

(6) Chemical Strengthening Step

Next, a chemical strengthening process was performed on the glass substrate subjected to the aforementioned lapping steps and polishing steps. In the chemical strengthening process, potassium nitrate (60%) and sodium nitrate (40%) were mixed with each other to prepare a chemical strengthening liquid. The chemical strengthening liquid was heated to 400° C. The cleaned glass substrate was preheated to 300° C. and immersed in the chemical strengthening liquid for about 3 hours. In order to chemically strengthen the entire surfaces of the glass substrate, the glass substrate was immersed in a state in which a plurality of glass substrates were received in a holder and held at their edges.

Thus, by the immersion process in the chemical strengthening liquid, lithium ions and sodium ions in the surface layer of the glass substrate are replaced with sodium ions and potassium ions in the chemical strengthening liquid, respectively, so that the glass substrate is strengthened. The thickness of a compressive stress layer formed on the surface layer of the glass substrate was about 100 μm.

The glass substrate subjected to the chemical strengthening process was immersed in a water tank of 20° C. and rapidly cooled. The glass substrate was held in that state for about 10 minutes. Then the rapidly cooled glass substrate was immersed in 10 weight % sulfuric acid that had been heated to about 40° C. and cleaned therein. Furthermore, the glass substrate subjected to the sulfuric acid cleaning was sequentially immersed in cleaning tanks of pure water and isopropyl alcohol (IPA).

(7) Main Surface Polishing Step (Final Polishing Step)

Next, a second polishing step was carried out as a final polishing step. The second polishing step is carried out primarily for mirror-finishing the main surfaces of the glass substrate. In the second polishing step, the main surfaces were mirror-polished with soft foaming resin polishers by a double-sided polishing device having a planetary gear mechanism. Cerium oxide abrasive particles (with a mean particle diameter of 0.8 μm) that were finer than the cerium oxide abrasive particles used in the first polishing step were used as an abrasive. The glass substrate subjected to the second polishing step was sequentially immersed and cleaned in cleaning tanks of neutral detergent, pure water, and IPA. Ultrasonic waves were applied to each of the cleaning tanks.

As described above, a flat, smooth, and highly rigid substrate for a magnetic disk was obtained by the first lapping step, the cutting step, the second lapping step, the edge polishing step, the first polishing step, the chemical strengthening step, and the second polishing step.

Glass substrates were produced while polishing conditions were varied in the edge polishing step. The shape profiles along the entire circumferences of inside holes of 100 glass substrates 1 were measured with a circularity measurement device (RA-324 manufactured by Mitutoyo Corporation). Roundness analysis software OmniRound produced by Digital Metrology Solutions, Inc. was used to filter the profiles with a Gaussian filter. Then a difference R between the least-square-approximated circle 27 and the profile 21 was obtained for each of the glass substrates 1. (All of the glass substrates 1 had a circularity not more than 5.5 μm.)

The number of sampling points was 3,600 for every 0.1 degree.

Next, a histogram of the differences was generated to obtain a skewness and a kurtosis.

Then a magnetic layer 18b, a protective layer 18c, and a lubricating layer 18d were provided on the surface of the glass substrate 1. Thus, a magnetic recording medium 100 was produced. The measurement system illustrated in FIG. 6 was used to obtain an axial displacement 3 s under conditions in which the rotational speed was 5,400 rpm and the measurement position r was 30 mm.

Subsequently, the skewness/kurtosis and the axial displacement 3 s, which represents the disk balance/TMR characteristics, were plotted to obtain the relationship therebetween.

As a comparative example, the circularity root mean square Rrms of the differences R, which is given by the following formula (5), and the axial displacement 3 s were plotted to obtain the correlation therebetween.

$$Rrms = \sqrt{\frac{R_1^2 + R_2^2 \ldots + R_n^2}{n}} \quad (5)$$

In the formula (5), n is the number of samples, and $R_i$ is a difference at each sampling point.

Figure 9:
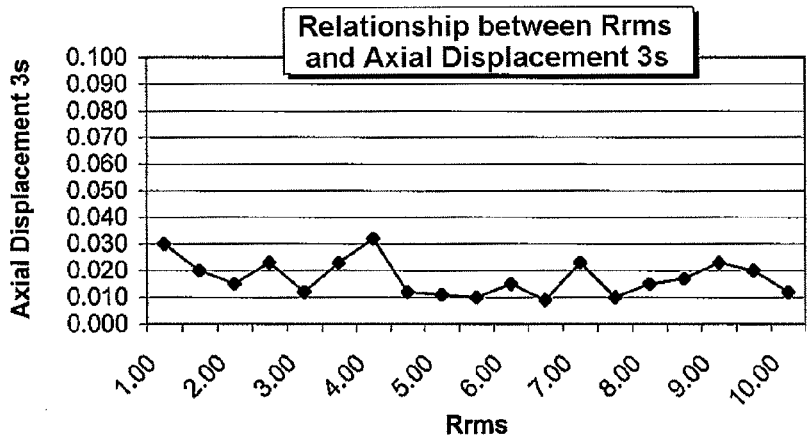
FIG. 9 is a correlation diagram of Rrms and an axial displacement 3 s.

FIG. 5 shows the generated histogram. FIG. 7 shows a correlation between the skewness of the glass substrate 1 and the TMR characteristics (axial displacement 3 s). FIG. 8 shows a correlation between the kurtosis of the glass substrate 1 and the TMR characteristics (axial displacement 3 s). FIG. 9 shows a comparative example of a correlation between Rrms and the TMR characteristics.

As is apparent from FIGS. 7 and 8, a strong correlation existed between the skewness/kurtosis and the axial displacement 3 s.

Specifically, in FIG. 7, the axial displacement 3 s was constant at 0.005 μm while Sk was in a range of 0.55 to −0.55.

Furthermore, in FIG. 8, the axial displacement 3 s was constant at 0.005 μm while the value (Ku−3) obtained by subtracting 3 from Ku was in a range of 1.6 to −1.6.

Meanwhile, as is apparent from FIG. 9, no strong correlation existed between Rrms and the axial displacement 3 s. The disk balance/TMR characteristics could not uniquely be evaluated from Rrms.

It can be seen from the above results that the shape of an inside hole 5 of a glass substrate 1 can be formed so as to meet demands for the disk balance/TMR characteristics (axial displacement 3 s) based upon a parameter (skewness/kurtosis) according to the present invention.

(Skewness and Kurtosis)

Next, the following glass substrates were produced with varied process conditions of the edge polishing step.

(A) A glass substrate in which a skewness (Sk) was in a range of 0.55 to −0.55 and a value (Ku−3) obtained by subtracting 3 from a kurtosis (Ku) was in a range of 1.6 to −1.6.

(B) A glass substrate in which a skewness was out of the range described for (A) and a value (Ku−3) obtained by subtracting 3 from a kurtosis (Ku) was in the range described for (A).

(C) A glass substrate in which a skewness was in the range described for (A) and a value (Ku−3) obtained by subtracting 3 from a kurtosis (Ku) was out of the range described for (A).

(D) A glass substrate in which a skewness was out of the range described for (A) and a value (Ku−3) obtained by subtracting 3 from a kurtosis (Ku) was out of the range described for (A).

The TMR characteristics of those glass substrates were measured. As a result of measurements, the sample (A) exhibited the most favorable TMR characteristics. The samples (B) and (C) exhibited TMR characteristics that would arise no practical problem. The TMR characteristics of the sample (D) were at an impractical level.

(Relationship Between the Circularity and the Skewness/Kurtosis)

Next, the relationship between the circularity and the skewness/kurtosis was examined. First, a plurality of glass substrates having different circularities were produced with varied process conditions of the edge polishing step. The TMR characteristics of those glass substrates were obtained. As a result, as the circularity became smaller, a rate of glass substrates exhibiting favorable TMR characteristics increased. Some of glass substrates having the same circularity of 3.0 μm exhibited favorable TMR characteristics, and others not. Then the skewness (Sk) and a value (Ku−3) obtained by subtracting 3 from the kurtosis (Ku) of those glass substrates were measured. As a result, the skewness (Sk) and the value (Ku−3) obtained by subtracting 3 from the kurtosis (Ku) of glass substrates that exhibited favorable TMR characteristics were within the aforementioned ranges. The skewness (Sk) and the value (Ku−3) obtained by subtracting 3 from the kurtosis (Ku) of glass substrates that exhibited unfavorable TMR characteristics were out of the aforementioned ranges. Furthermore, when the rotational speed was increased to 10,000 rpm, some of glass substrates having the same circularity of 0.7 μm exhibited good TMR characteristics, and others did not. When the skewness (Sk) and the kurtosis (Ku) of those glass substrates were measured, the same results as described above were obtained. In other words, even in a case where the circularity is as small as 0.7 μm or less, the TMR characteristics can further be improved by setting the skewness (Sk) and the value (Ku−3) obtained by subtracting 3 from the kurtosis (Ku) within the aforementioned ranges.

(Relationship Between a Ratio of the Inner Circumferential Surface in Thickness and the TMR Characteristics)

Next, with regard to glass substrates 1 in which at least one of the skewness (Sk) and the value (Ku−3) obtained by subtracting 3 from the kurtosis (Ku) was within the aforementioned range, a ratio of the height of an inner circumferential surface of a glass substrate to the thickness of the glass substrate was varied. The relationship between such a ratio and the TMR characteristics was examined.

Specifically, glass substrates were produced with varied process conditions of the cutting step and the edge polishing step such that a ratio of an inner circumferential surface in thickness was 40%, 55%, 60%, or 70% and that the skewness (Sk) and the value (Ku−3) obtained by subtracting 3 from the kurtosis (Ku) were within the aforementioned range. The TMR characteristics of those glass substrates were examined. As a result, when the TMR characteristics of the 40% glass substrate were defined as 100%, the TMR characteristics of (A) the 55% glass substrate, (B) the 60% glass substrate, and (C) the 70% glass substrate were (A) 150%, (B) 190%, and (C) 250%, respectively. In other words, it can be seen that a ratio of the inner circumferential surface in thickness should preferably be at least 55%. The calculation was made assuming that the rotational speed of the disk was 10,000 rpm and that the ratio of the TMR characteristics was (TMR characteristics of the 40% glass substrate)/(TMR characteristics of the glass substrate having another ratio). That is, as the ratio of the TMR characteristics became higher, better results were obtained.

Meanwhile, the following glass substrates were produced using crystallized glass as a glass material having a higher Young's modulus in order to further improve the TMR characteristics. The composition of the crystallized glass will be described later.

(A) A glass substrate in which a skewness (Sk) was in a range of 0.55 to −0.55 and a value (Ku−3) obtained by subtracting 3 from a kurtosis (Ku) was in a range of 1.6 to −1.6.

(B) A glass substrate in which a skewness was out of the range described for (A) and a value (Ku−3) obtained by subtracting 3 from a kurtosis (Ku) was in the range described for (A).

(C) A glass substrate in which a skewness was in the range described for (A) and a value (Ku−3) obtained by subtracting 3 from a kurtosis (Ku) was out of the range described for (A).

The TMR characteristics of each of those glass substrates were compared with the TMR characteristics of the aforementioned glass substrates using amorphous glass. In order to emphasize differences therebetween, the circularity was 0.7 μm, and the rotational speed of a disk was increased to 10,000 rpm. As a result, the glass substrates using crystallized glass exhibited more favorable TMR characteristics. In other words, even in a case where the circularity is as small as 0.7 μm or less, the TMR characteristics can further be improved with use of crystallized glass by setting the skewness (Sk) and the value (Ku−3) obtained by subtracting 3 from the kurtosis (Ku) within the aforementioned ranges.

According to weight percentage based upon an oxide, the aforementioned crystallized glass contained $SiO_2$ of 49.60%, $P_2O_5$ of 1.00%, $Al_2O_3$ of 18.00%, $B_2O_3$ of 1.00%, $Na_2O$ of 4.00%, MgO of 8.00%, ZnO of 14.00%, $TiO_2$ of 4.00%, and $CeO_2$ of 0.40%. The crystallized glass contained $RAl_2O_4$ as a primary crystal phase where R was each of Zn and Mg. The crystal particle diameter of the primary crystal phase was 6 nm. The degree of crystallinity was 6%. The specific gravity was 2.846. The crystallized glass had a Young's modulus of 102 GPa.

Second Embodiment

A second embodiment of the present invention will be described below in detail with reference to FIGS. 10A to 18. The reference numerals illustrated in FIGS. 10A to 18 are used for explanation of the second embodiment and separated from the reference numerals of FIGS. 1A to 9 described in the first embodiment. In other words, the reference numerals used in the second embodiment are used for explanation of FIGS. 10A to 18. This holds true for the step numbers. The step numbers used in the second embodiment are used for explanation of the second embodiment. Part of information overlapping in the first and second embodiments is described in both of the first and second embodiments.

First of all, a structure of a glass substrate 1 according to the second embodiment will briefly be described with reference to FIGS. 10A to 10C.

Figure 10A:
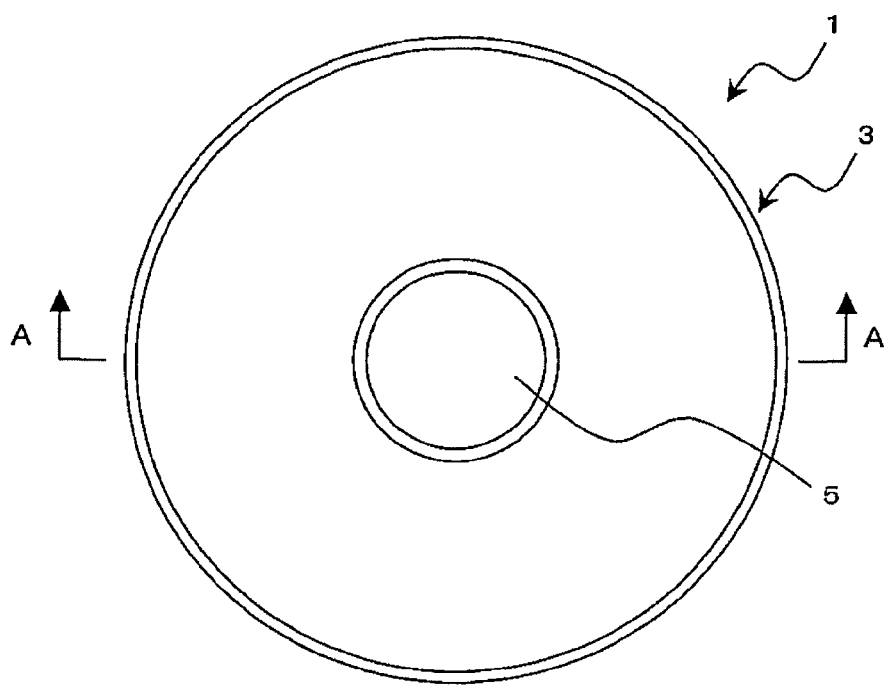
FIG. 10A is a plan view of a glass substrate 1.

As shown in FIG. 10A, the glass substrate 1 has a body 3 having a disk-like shape. The body 3 has an inside hole 5 formed at the center thereof.

Figure 10B:
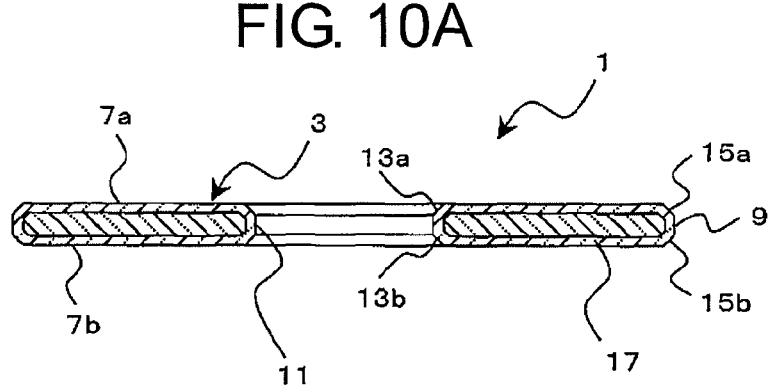
FIG. 10B is a cross-sectional view taken along line A-A of FIG. 10A.
Figure 10C:
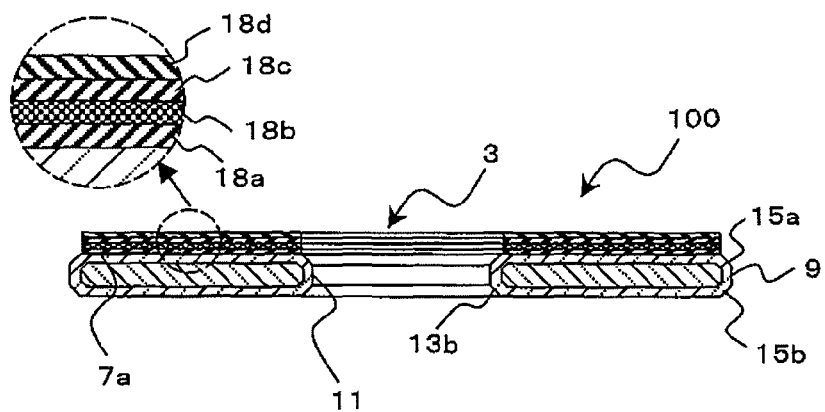
FIG. 10C is a cross-sectional view showing a magnetic recording medium 100.

As shown in FIG. 10B, the body 3 has main surfaces 7a and 7b that are substantially flat.

A layer for recording and reading information is formed on the main surfaces 7a and 7b. For example, as shown in FIG. 10C, an underlayer 18a, a magnetic layer 18b, a protective layer 18c, and a lubricating layer 18d are provided on one or both of the main surfaces 7a and 7b to thereby form a magnetic recording medium 100 along with the glass substrate 1. At least the magnetic layer 18b is required as a recording layer.

Furthermore, as shown in FIG. 10B, the body 3 has an inner circumferential surface 11 and an outer circumferential surface 9, which are perpendicular to the main surfaces 7a and 7b.

The shapes of the inner circumferential surface 11 and the outer circumferential surface 9 are configured such that an evaluation value defined by a parameter indicating an uneven distribution of irregularities of a profile of the outer circumferential surface 9 and a profile of the inner circumferential surface 11 and a difference of the centers of the outer circumferential surface 9 and the inner circumferential surface 11 is within a predetermined range. The details of this configuration will be described later.

The inner circumferential surface 11 and the outer circumferential surface 9 are chamfered so as to have inner chamfered surfaces 13 and outer chamfered surfaces 15, respectively.

Furthermore, a chemical strengthening layer 17 is formed on the surfaces of the body 3.

For example, the chemical strengthening layer 17 is a compressive stress layer in which part of ions of glass as a material of the glass substrate 1 has been replaced with ions having a larger ionic radius. The detail of the chemical strengthening layer 17 will be described later.

Next, a method of manufacturing a glass substrate 1 will be described with reference to FIG. 10A to 11.

In the following description, glass in a manufacturing process is referred to as a "glass base material 1a," and a finished product is referred to as a "glass substrate 1."

A specific manufacturing method will be described in greater detail.

Figure 11:
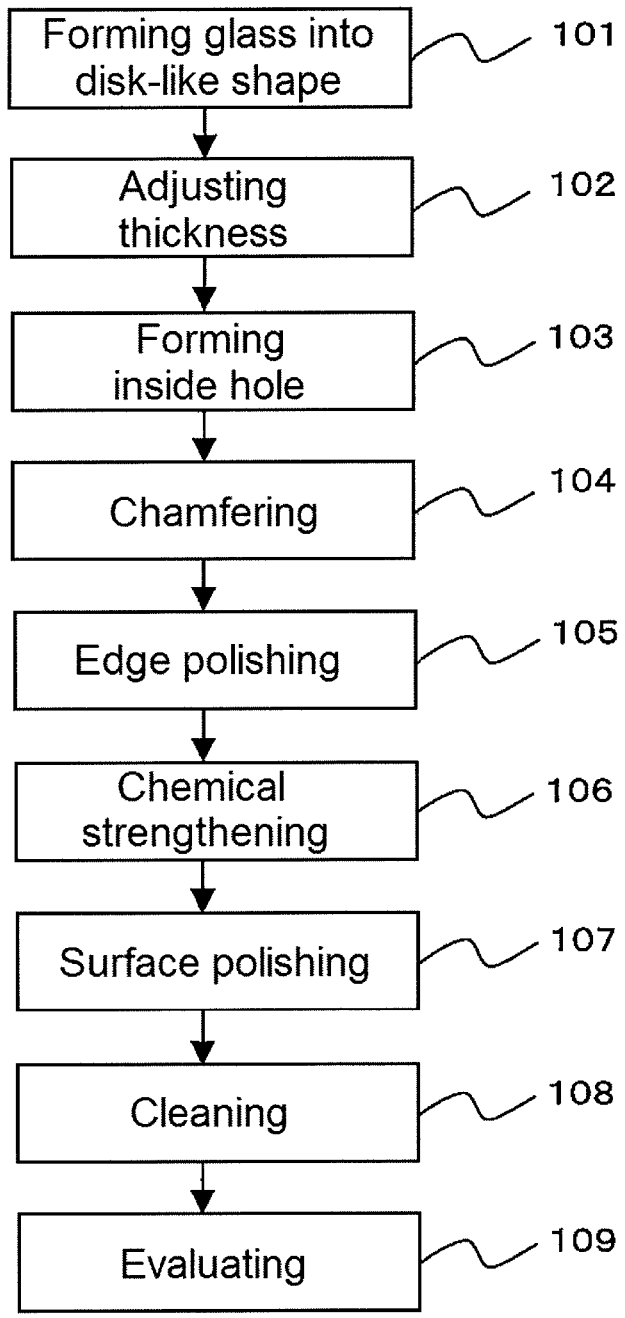
FIG. 11 is a flow chart showing the detail of a manufacturing method of a glass substrate 1.

First, as shown in FIG. 11, material glass is formed into a disk-like shape to produce a glass base material 1a (Step 101).

Examples of the material glass include soda-lime glass, aluminosilicate glass, borosilicate glass, and crystallized glass produced by, for example, a float method, a down-draw method, a redraw method, or a press method.

In the following description, glass produced by a press method will be described by way of example.

Subsequently, main surfaces 7a and 7b are ground with a grinder (first lapping) for adjusting the thickness of the glass base material 1a (Step 102).

For example, the grinding is conducted with a double-sided lapping device and abrasive particles such as alumina.

Then, as shown in FIG. 11, an inside hole 5 (see FIG. 10A) is formed at the center of the glass base material 1a (Step 103).

The inside hole 5 is formed by, for example, using a core drill.

If sheet glass is used, Steps 101-103 are not carried out. Instead, glass is cut into a disk-like shape from the sheet with use of a cutter, and then an inside hole 5 is cut out of the glass (cutting step).

Next, as shown in FIG. 11, an inner circumferential surface 11 and an outer circumferential surface 9 are chamfered for removing cracks of edges of the glass base material 1a (Step 104). The inner circumferential surface 11 and the outer circumferential surface 9 are chamfered with use of a grindstone having diamond abrasive particles fixed thereon.

A step of grinding the main surfaces 7a and 7b (second lapping) may be added after the chamfering. With this step, irregularities of the main surfaces that have been produced by the formation of the inside hole 5 or the chamfering can be ground so that a load on polishing can be reduced.

Subsequently, as shown in FIG. 11, a polishing step of the inner circumferential surface 11 and the outer circumferential surface 9 of the glass base material 1a (edge polishing) is carried out (Step 105).

For example, the edge polishing is conducted with use of a rotary brush.

Then, as shown in FIG. 11, a chemical strengthening treatment is performed on the glass base material 1a to form a chemical strengthening layer 17 on the glass base material 1a (Step 106).

Specifically, the glass is immersed in a chemical strengthening liquid so that ions contained in the chemical strengthening liquid that have an ionic radius larger than ionic radii of ions contained in the glass are ion-exchanged with the ions contained in the glass. Thus, a chemical strengthening layer 17 is formed.

After the chemical strengthening, the glass base material 1a is cleaned so that the chemical strengthening liquid is removed from the surfaces of the glass base material 1a. Thereafter, as shown in FIG. 11, the main surfaces 7a and 7b of the glass base material 1a are polished in order to adjust (substantially smoothen) the flatness and the surface roughness of the main surfaces 7a and 7b (Step 107).

The polishing is conducted with, for example, a double-sided polishing device and a hard resin polisher by using a planetary gear mechanism. For example, slurry in which abrasive particles of cerium oxide, lanthanum oxide, or the like have been dispersed in water is used as a polishing liquid.

After the polishing, the glass base material 1a is cleaned so that abrasives and impurities attached to the surfaces of the glass base material 1a during the manufacturing process are removed (Step 108).

Specific examples of the cleaning process include physical cleaning such as scrubbing cleaning or ultrasonic cleaning, and chemical liquid cleaning using fluoride, organic acid, hydrogen peroxide, surface-active agent, or the like.

In this example, Step 101 (forming the glass into a disk-like shape), Step 103 (forming the inside hole), Step 104 (chamfering), and Step 105 (edge polishing) of Steps 101-108 are likely to produce variations in edge profiles along a circumferential direction, which exert influence on the disk shape balance/TMR characteristics on which the inventor has focused attention. For example, Steps 101 and 103 are most likely to produce a difference between central positions of the outer inner circumference and the inner circumference. Therefore, in order to reduce the difference between central positions of the outer circumference and the inner circumference, it is effective to adjust alignment of a central position of the outer circumference after Step 101 and a central position of an inside hole tool before Step 103, or to carry out Steps 101 and 103 simultaneously (compass type processing of inner and outer circumferences with the same center of rotation). In Step 104, a good shape profile can be obtained by (1) alignment of a central position or a vertical position of a grindstone of diamond abrasive particles for inner and outer circumferences when the diamond abrasive particles are attached to the apparatus or (2) equalization of pressing forces of the diamond abrasive particles against a workpiece (reduction of partial unbalanced contact). Furthermore, in Step 105, a good shape profile can be obtained by (1) equalization of pressing forces of a polishing brush against a workpiece or (2) processing under such conditions that pressing forces of the polishing brush against the workpiece are held constant irrespective of a stacked location of the workpiece in a stacking case where workpieces are processed while those workpieces are stacked. Nevertheless, it is more preferable to carry out Step 105 in the following manner.

In Step 105, it is more preferable to carry out a polishing step of the inner circumferential surface as follows: The inner circumferential surface 11 of the glass base material 1a is edge-polished with use of a rotary brush. Additionally, an inner circumference polishing unit having a rotation axis and a plurality of polishing clothes arranged around the rotation axis is brought into contact with the inner circumferential surface 11 of the glass base material 1a under equal pressures. A polishing liquid is supplied to between the inner circumferential surface 11 of the glass base material 1a and the inner circumference polishing unit. The inner circumference polishing unit and the glass base material 1a are rotated about the rotation axis relative to each other or moved along the rotation axis relative to each other to thus polish the inner circumferential surface 11 of the glass base material 1a.

With the above polishing step of the inner circumferential surface, the polishing clothes can be pressed with surface contact against the whole inner circumferential surface 11 of the glass base material 1a under equal pressing forces. Therefore, the roughness of the chamfered surfaces and the inner circumferential surface 11 of the glass base material 1a can be lowered. At the same time, a favorable shape profile that can improve the TMR characteristics can be obtained. This is because variations or relative unevenness of the profiles of the inner and outer circumferences can be reduced by reducing swell (irregularities) of the shape of the inner circumferential surface. In order to obtain the aforementioned good shape profile, it is more preferable to rotate both of the inner circumference polishing unit having the rotation axis and the glass substrate 1a in opposite directions for polishing and to set a ratio of a rotational speed of the inner circumference polishing unit and a rotational speed of the glass substrate 1a (a rotational speed of the inner circumference polishing unit/a rotational speed of glass substrate 1a) within a range of 1.5 to 5.0. Additionally, in order to obtain the aforementioned good shape profile, it is more preferable to set a machining allowance of the inner circumferential surface 11 for the polishing step of the inner circumferential surface to be not more than 1% of the inside diameter.

Finally, a product inspection is performed (Step 109).

Now the detail of Step 109 will be described with reference to FIGS. 12 to 15.

As described above, the inner circumferential surface 11 and the outer circumferential surface 9 of the glass substrate 1 are formed such that an evaluation value defined by a parameter indicating an uneven distribution of irregularities of the profile of the outer circumferential surface 9 and the profile of the inner circumferential surface 11 and a difference between central positions of the outer circumferential surface 9 and the inner circumferential surface 11 is within a predetermined range. In order to evaluate such a parameter, the profiles of the inner circumferential surface 11 and the outer circumferential surface 9 are measured so as to obtain the parameter. Then whether or not the parameter is within the predetermined range is determined.

Specifically, an inspection is performed in the following manner.

Figure 12:
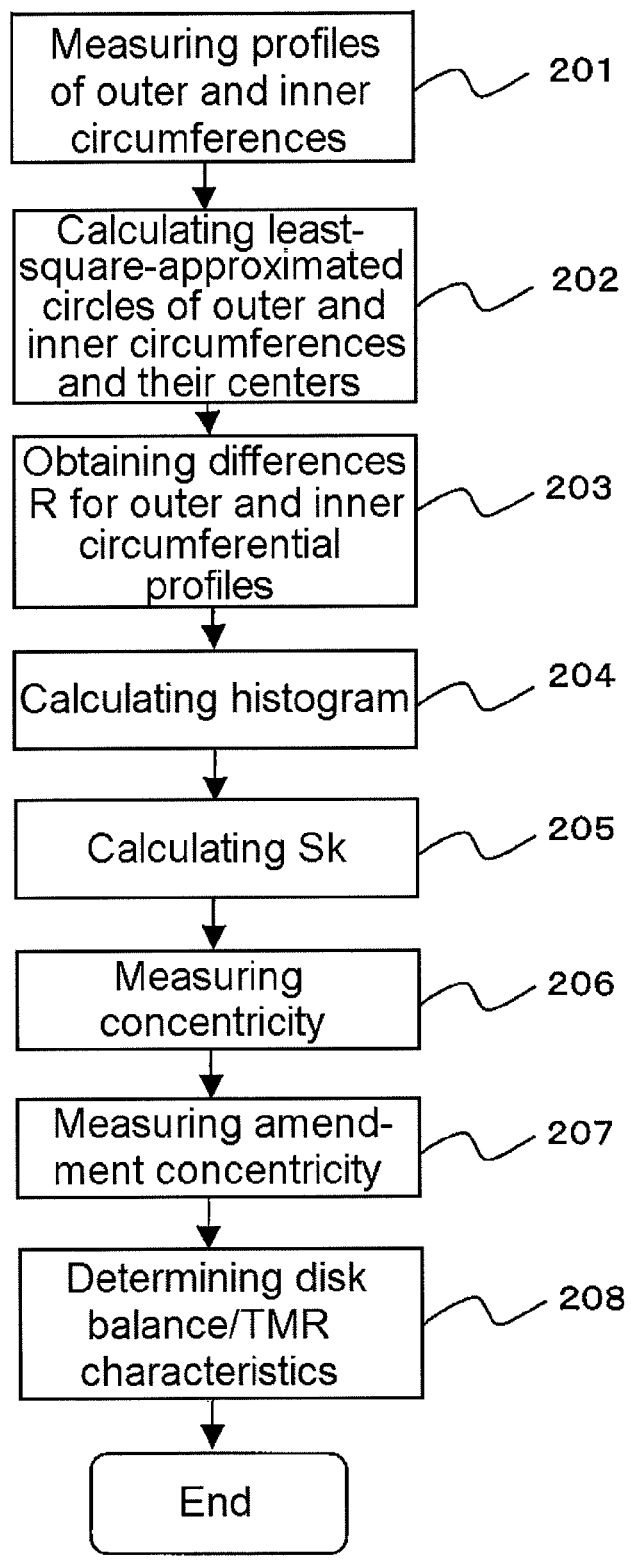
FIG. 12 is a flow chart showing the detail of Step 109 in FIG. 11.

First, as shown in FIG. 12, the shapes of the inner circumferential surface 11 and the outer circumferential surface 9 of the glass substrate 1 are measured with a known circularity/concentricity measurement device or the like. Thus, shape profiles of the inner circumferential surface 11 and the outer circumferential surface 9 are generated (Step 201).

Figure 13A:
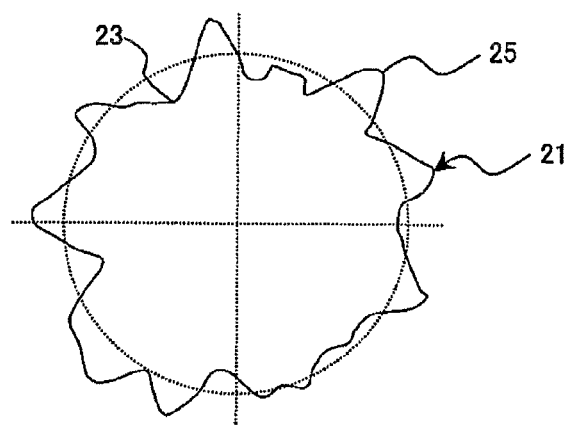
FIGS. 13A to 13C are diagrams explanatory of Step 109 in FIG. 11.

FIG. 13A shows an example of the generated profile. For reference, in FIG. 13A, a designed dimension of the inner circumferential surface 11 (or the outer circumferential surface 9) is indicated by a dotted circle, and the position of the center of the inner circumferential surface 11 (or the outer circumferential surface 9) is indicated by dotted lines.

In FIG. 13A, irregularities of a surface of a profile 21 are enlarged at a certain magnification. As shown in FIG. 13A, there are recessed portions (depressions 23) and projecting portions (protrusions 25).

Then, as shown in FIG. 12, a least-square-approximated circle of the generated profile and its center are calculated for each of the inner circumferential surface 11 and the outer circumferential surface 9 (Step 202).

Figure 13B:
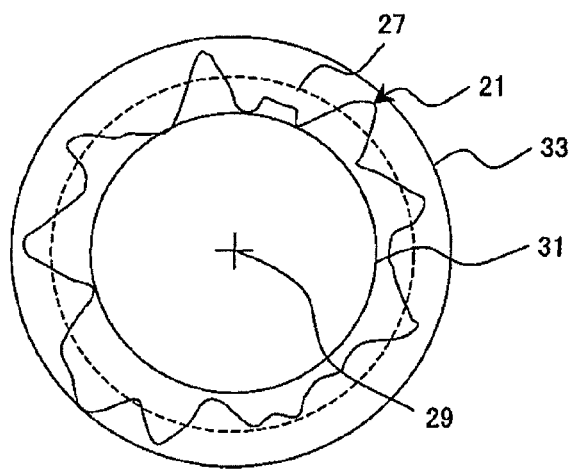
Figure 13C:
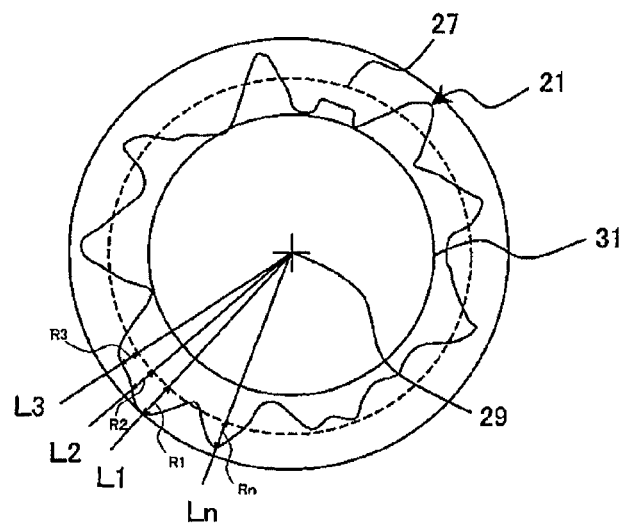

FIG. 13B illustrates an example of Step 202.

FIG. 13B shows a least-square-approximated circle 27 and its center 29. For reference, FIG. 13B also shows an inscribed circle 31 passing through the innermost point of the profile (the most recessed point) and a circumscribed circle 33 passing through the outermost point of the profile (the most projecting point).

Figure 15:
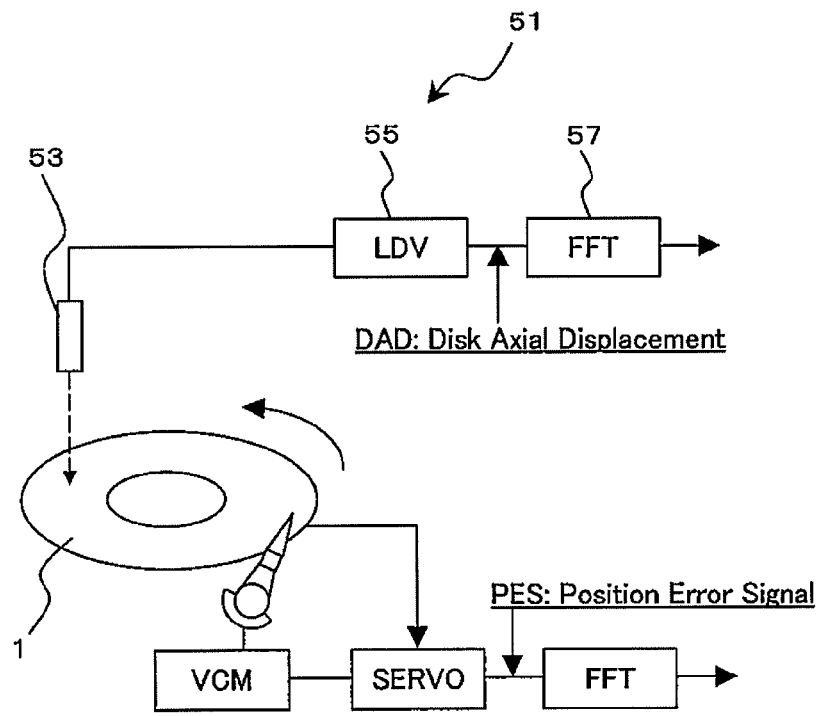
FIG. 15 is a conceptual diagram showing a measurement system 51 for TMR characteristics (axial displacement 3 s)

Subsequently, as shown in FIG. 15, a line (perpendicular line) is dropped to the least-square-approximated circle 27 from the center 29 of the least-square-approximated circle 27 for each of the inner circumferential surface 11 and the outer circumferential surface 9. As shown in FIG. 13C, a distance between the least-square-approximated circle 27 and the profile 21 on the line is obtained as a difference R (Step 203).

FIG. 13C illustrates an example of Step 203.

As shown in FIG. 13C, n lines corresponding to a desired number of samples are drawn as shown by lines L1, L2, . . . , Ln, and n differences between the least-square-approximated circle 27 and the profile 21 that correspond to the number of samples are obtained as shown by differences R1, R2, . . . , Rn.

The number of samples and intervals (angles) between the lines may be set in any desired manner.

Then a histogram of the differences R is generated for each of the inner circumferential surface 11 and the outer circumferential surface 9 (Step 204).

Figure 14:
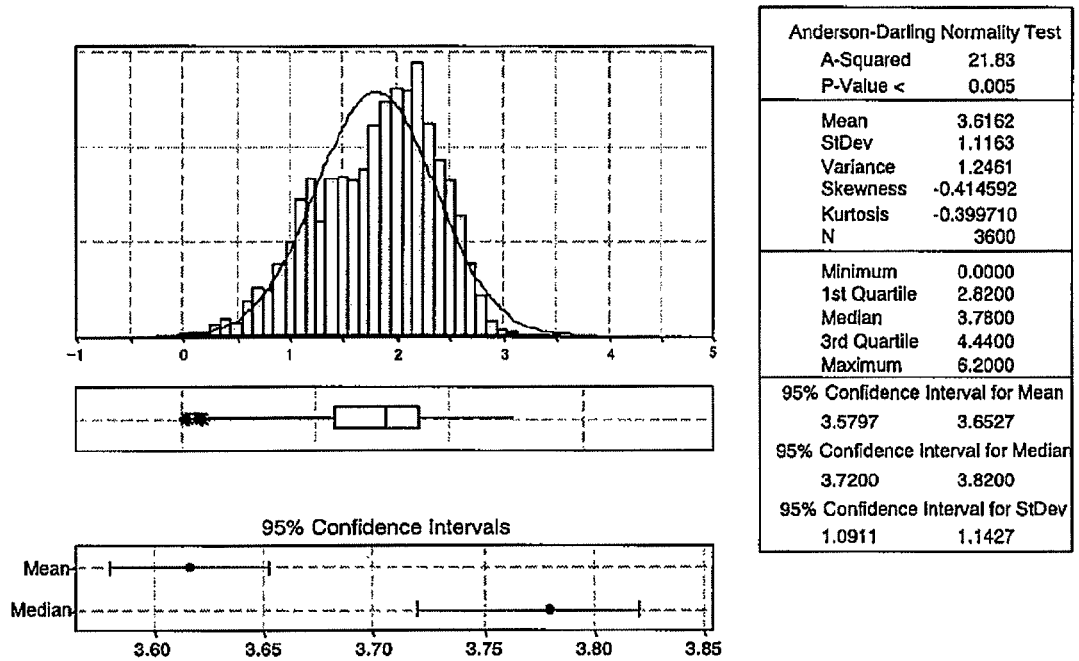
FIG. 14 is a diagram explanatory of Step 109 in FIG. 11.

Specifically, for example, a histogram of values of the differences R and the number of sampling points with those values is generated as shown in FIG. 14.

Next, as shown in FIG. 12, a skewness (Sk), which indicates an uneven distribution of irregularities of the profile, is calculated based upon the distribution of the histogram for each of the inner circumferential surface 11 and the outer circumferential surface 9. More specifically, a skewness is calculated by using the following formula (A) (Step 205).

$$Sk = \sum_{i=1}^{n} \frac{R_i^3}{n\sigma^3} \qquad (A)$$

In the formula (A), $R_i$ is a difference, n is the number of samples, and σ is a standard deviation.

Subsequently, as shown in FIG. 12, a distance between the centers of the inner circumferential surface 11 and the outer circumferential surface 9 is measured (Step 206).

Specifically, a distance between the centers of least-square-approximated circles of the shape profiles of the inner circumferential surface 11 and the outer circumferential surface 9, i.e., a concentricity C according to the conventional definition is calculated.

Then, as shown in FIG. 12, an amendment concentricity AC, which is a combination of a skewness and a concentricity C, is calculated for each of the inner circumferential surface 11 and the outer circumferential surface 9 (Step 207).

Specifically, an amendment concentricity AC, which takes into consideration a skewness, is calculated by using the following formula (B).

$$AC = C\left(1 + \frac{Sk_{OD}}{Sk_{ID}}\right) \quad (B)$$

In the formula (B), $SK_{OD}$ is a skewness of the outer circumferential surface, $SK_{ID}$ is a skewness of the inner circumferential surface, and C is a concentricity (distance between centers of least-square-approximated circles of the shape profiles of the inner circumferential surface 11 and the outer circumferential surface 9).

In the formula (B), $SK_{OD}/SK_{ID}$ is defined as zero when the shape profiles of the inner circumferential surface 11 and the outer circumferential surface 9 completely conform to the normal distribution ($SK_{OD}/SK_{ID} \to +\infty$ or $-\infty$).

Next, as shown in FIG. 12, whether or not the disk balance/TMR characteristics of the glass substrate 1 are within a predetermined range is determined from the correlation between the amendment concentricity AC and the disk balance/TMR characteristics. If the disk balance/TMR characteristics are within the predetermined range, then the glass substrate 1 is regarded as a non-defective product. Otherwise, the glass substrate 1 is regarded as a defective product (Step 208).

Figure 17:
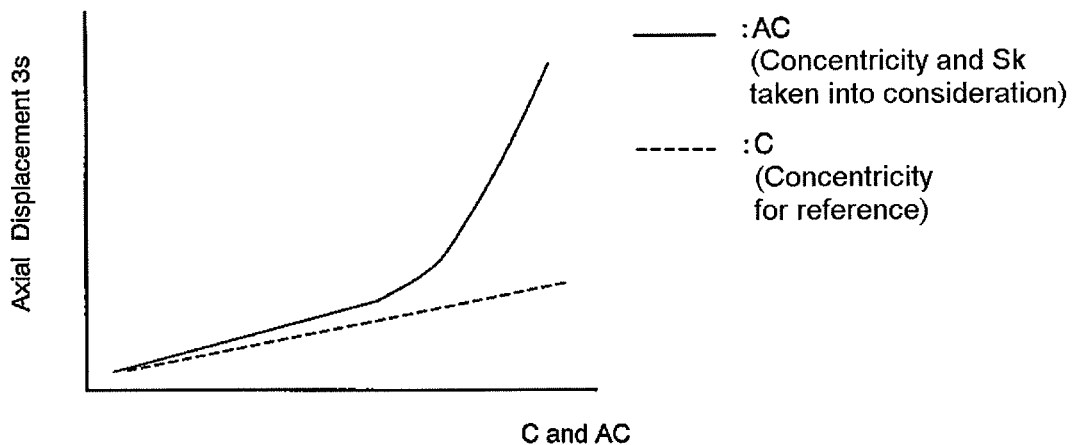
FIG. 17 is a correlation diagram of a concentricity C or an amendment concentricity AC and an axial displacement 3 s.
Figure 18:
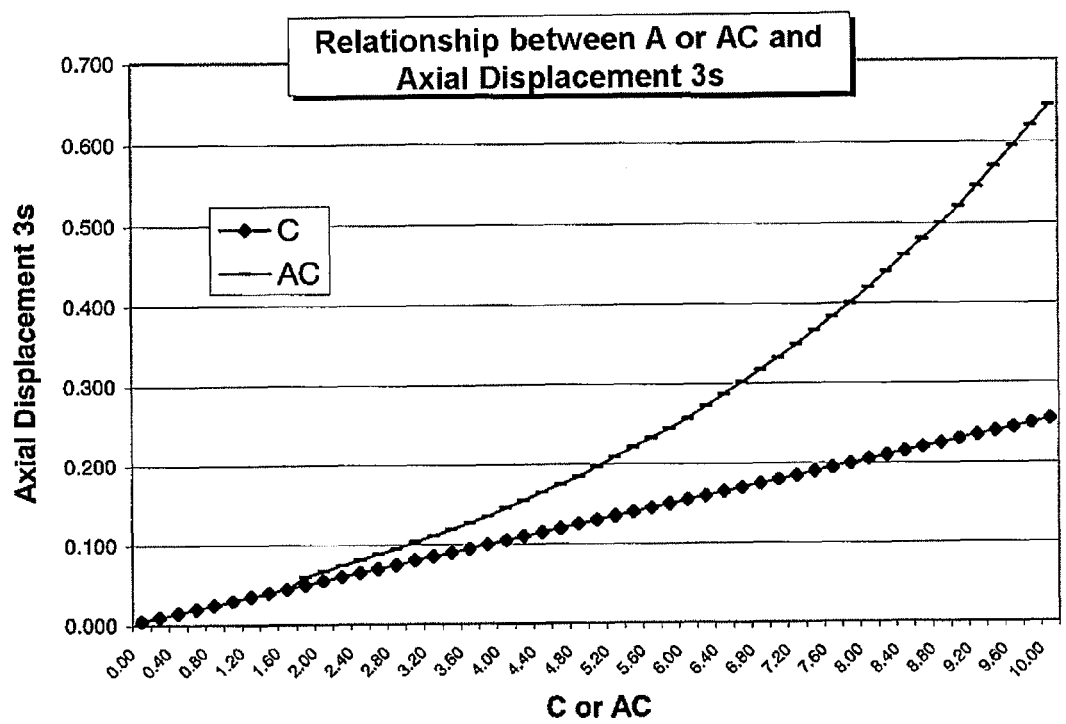
FIG. 18 is a correlation diagram of a concentricity C or an amendment concentricity AC and an axial displacement 3 s.

Specifically, whether or not the amendment concentricity AC is within the predetermined range is determined from the relationship between the amendment concentricity AC and the axial displacement 3 s, which represents the disk balance/TMR characteristics (see FIGS. 17 and 18). More specifically, whether or not the amendment concentricity AC is within such a range that the axial displacement 3 s is not more than a predetermined value is determined.

The axial displacement 3 s is a track positioning error of an average +3 s calculated by integrating substrate vibration measurement data (vibration waveforms) for each rotational speed and for each frequency. For example, 3 s and $s^2$ are calculated by the following formulas (C) and (D).

$$3s = 3\sqrt{\int_0^f PSD_{PES}(f)df} \quad (C)$$

$$s^2 = \int_0^f PSD_{DAD}(f)df \quad (D)$$

In the formulas (C) and (D), PSD is an energy spectral density, PES is a position error signal, and DAD is a disk axial displacement.

Now there will briefly be described a reason why the amendment concentricity AC calculated by the formula (B) is used for evaluation of the disk balance/TMR characteristics.

First, the inventor examined the relationship between the concentricity and the disk balance/TMR characteristics and then assumed that the disk balance/TMR characteristics are affected by differences of absolute values and polarities (plus or minus) of the skewness of the inner circumferential surface 11 and the outer circumferential surface 9.

Figure 16:
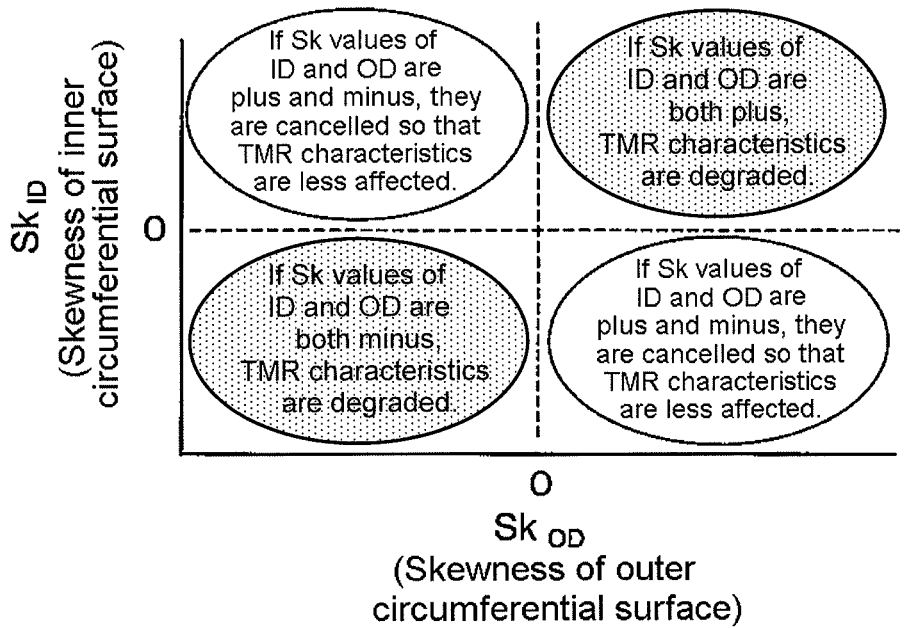
FIG. 16 is a diagram showing a relationship between a skewness (Sk) of an outer circumferential surface 9 and an inner circumferential surface 11 and TMR characteristics.

Further examination based upon this assumption has revealed that the relationship as shown in FIG. 16 exists between the skewness of the inner circumferential surface 11 and the outer circumferential surface 9 and the disk balance/TMR characteristics.

Specifically, as shown in FIG. 16, it has been confirmed that, when values of the skewness of the inner circumferential surface 11 and the outer circumferential surface 9 have different polarities (different signs of plus and minus), influences on the disk balance/TMR characteristics by the skewness are cancelled. It has been confirmed that, when values of the skewness of the inner circumferential surface 11 and the outer circumferential surface 9 have the same polarity, the disk balance/TMR characteristics are degraded.

Therefore, an amendment concentricity AC is introduced based upon the above findings by considering the absolute values and the polarity of the skewness of the inner circumferential surface 11 and the outer circumferential surface 9 with respect to the concentricity. As shown in FIG. 17, when an amendment concentricity AC was used, the axial displacement 3 s (disk balance/TMR characteristics) more rapidly changed as compared to a case where a concentricity C was used. Thus, a strong correlation existed between the amendment concentricity AC and the axial displacement 3 s.

According to the present invention, the formula (B) is used to obtain an amendment concentricity AC for the above reason.

Now there will briefly be described a method of obtaining the relationship between the skewness and the axial displacement 3 s as shown in FIGS. 17 and 18.

First, a predetermined number of glass substrates 1 to be inspected are produced, and the skewness of those glass substrates 1 is obtained.

Then a magnetic layer 18b, a protective layer 18c, and a lubricating layer 18d are provided on surfaces of each of the glass substrates 1. Thus, magnetic recording media 100 are produced. With use of a measurement system 51 illustrated in FIG. 15, the axial displacement 3 s is obtained at a certain rotational speed and a certain measurement point.

The measurement system 51 will briefly be described. The measurement system 51 has a laser Doppler velocimeter (LDV) 55 with a head 53 and a converter 57 for performing a fast Fourier transform (FFT) on data measured by the laser Doppler velocimeter 55.

Then the skewness and the axial displacement 3 s, which represents the disk balance/TMR characteristics, are plotted so as to generate correlation diagrams as shown in FIGS. 17 and 18.

The above is the detail of Step 109.

Thus, according to the second embodiment, the evaluation value of the glass substrate 1 that is calculated from a combination of the skewness/kurtosis of each of the inner circumferential surface 11 and the outer circumferential surface 9 and the distance between the centers of the inner circumferential surface 11 and the outer circumferential surface 9 is within a predetermined range that meets the requirements for the disk balance/TMR characteristics.

Therefore, servo information including track information being stored can stably be read from a magnetic disk when the glass substrate 1 is used for an HDD.

Next, the inside hole of the glass substrate 1 according to the second embodiment will be described in detail.

When the shape profiles of the inside hole and the outer circumference of the glass substrate 1 according to the second embodiment are obtained, the amendment concentricity AC calculated using those profiles and the concentricity C by the formula (B) is preferably 9.6 μm or less, more preferably 8.0 μm or less, and more preferably 5.0 μm or less. In a case of a glass substrate for a magnetic disk used for a server, more favorable TMR characteristics can be obtained by setting the amendment concentricity AC at 8.0 μm or less. Furthermore, since a magnetic disk having a storage capacity of at least 500 GBytes per one 2.5-inch disk (380 kTPI to 420 kTPI) has a high track density, it is preferable to set the amendment concentricity AC at 5.0 μm or less in order to prevent servo errors.

When the shape profile of the inner circumferential surface 11 of the glass substrate 1 according to the second embodiment is obtained and analyzed, the skewness (Sk) described in the first embodiment is preferably in a range of 0.55 to −0.55, more preferably 0.35 to −0.35, and more preferably 0.20 to −0.20 while the amendment concentricity AC of the glass substrate 1 is within the aforementioned range. Within such a range, the glass substrate 1 can be used for a magnetic disk that can achieve good TMR characteristics. In a case where the glass substrate 1 for a magnetic disk is used to produce an HDD drive for reading and writing information, reading and writing operations of information may be inhibited by external impact. Even in such a situation, good TMR characteristics can be exhibited if the skewness (Sk) is in a range of 0.35 to −0.35.

When the shape profile of the inner circumferential surface 11 of the glass substrate 1 according to the second embodiment is obtained and analyzed, a value (Ku−3) obtained by subtracting 3 from the kurtosis (Ku) described in the first embodiment is preferably in a range of 1.6 to −1.6, more preferably 1.0 to −1.0, and more preferably 0.5 to −0.5 while the amendment concentricity AC of the glass substrate 1 is within the aforementioned range. Within such a range, the glass substrate 1 can be used for a magnetic disk that can achieve good TMR characteristics. In a case where the glass substrate 1 for a magnetic disk is used to produce an HDD drive for reading and writing information, reading and writing operations of information may be inhibited by external impact. Even in such a situation, good TMR characteristics can be exhibited if the value (Ku−3) obtained by subtracting 3 from the kurtosis (Ku) is in a range of 1.0 to −1.0.

Furthermore, the circularity of the inside hole of the glass substrate 1 according to the second embodiment is preferably 5.5 μm or less, more preferably 5 μm or less, and more preferably 3 μm or less while the amendment concentricity AC of the glass substrate 1 is within the aforementioned range. Generally, a glass substrate 1 having a favorable circularity (e.g., a circularity of 5.5 μm or less) tends to exhibit more favorable TMR characteristics as compared to a glass substrate 1 having an unfavorable circularity (e.g., a circularity of 10 μm). Nevertheless, some of glass substrates having the same circularity may exhibit good TMR characteristics, and others may not. Therefore, when a glass substrate 1 has an inside hole with a shape profile having a circularity in the aforementioned range and also having a skewness and/or a kurtosis in the aforementioned range, the glass substrate 1 can be used for a magnetic disk that can exhibit more favorable TMR characteristics.

Moreover, a ratio of the height of the inner circumferential surface 11 to the thickness of the glass substrate 1 according to the present invention is preferably at least 55%, more preferably at least 60%, and more preferably at least 65% while the amendment concentricity AC of the glass substrate 1 is within the aforementioned range. If chamfered surfaces are not sufficiently ensured, chipping is likely to occur. Therefore, the upper limit of the ratio of the height of the inner circumferential surface 11 to the thickness of the glass substrate 1 is preferably set to be 90% or less. With the inner circumferential surface 11 having a height within the aforementioned range and also having a skewness and/or a kurtosis in the aforementioned range, the TMR characteristics can further be enhanced.

Example 2

The glass substrate 1 for a magnetic disk according to the second embodiment will be described in greater detail based upon some examples. The following examples and comparative examples are provided for explaining the second embodiment.

Glass substrates for a magnetic disk of 65/0.635 mmt were produced in the following manner. The shapes of inside holes of the glass substrates were measured, and the correlation between the shapes of the inside holes and the disk balance/TMR characteristics was obtained.

First, 100 glass substrates 1 were produced in the following manner.

(1) Shaping Step and First Lapping Step

In a method of manufacturing a glass substrate for a magnetic disk according to this example, a surface of a glass plate is lapped (ground) into a glass base material. A glass disk is cut out of the glass base material. Various glass plates may be used for the glass plate described above. For example, the glass plate may be produced from molten glass by known methods such as a press method, a float method, a down-draw method, a redraw method, and a fusion method. Among others, a press method can produce a glass plate inexpensively.

In this example, molten aluminosilicate glass was shaped into a disk by direct press using an upper mold, a lower mold, and a shell mold. Thus, an amorphous glass plate was obtained. The aluminosilicate glass primarily contained $SiO_2$ of 58 weight % to 75 weight %, $Al_2O_3$ of 5 weight % to 23 weight %, $Li_2O$ of 3 weight % to 10 weight %, and $Na_2O$ of 4 weight % to 13 weight %.

Then both of main surfaces of the glass plate were subjected to a lapping process. Thus, a disk-like glass base material was formed. The lapping step was carried out with free alumina-based abrasive particles by a double-sided lapping device using a planetary gear mechanism. Specifically, lapping surface plates were pressed upon both surfaces of the glass plate from an upper side and a lower side of the glass plate. A grinding liquid including free abrasive particles was supplied onto the surfaces of the glass plate. The lapping surface plates and the glass plate were moved relative to each other. Thus, a lapping step was carried out. A glass base material having flat main surfaces was obtained by the lapping step.

(2) Cutting Step (Coring and Chamfering)

Next, an inside hole was formed at a central portion of the glass substrate with a cylindrical diamond drill. Thus, an annular glass substrate was formed (coring). Then an inner circumferential surface and an outer circumferential surface of the glass substrate were ground with diamond grindstone. Thus, a chamfering process was performed (chamfering).

(3) Second Lapping Step

Thereafter, a second lapping step was carried out on both of main surfaces of the obtained glass substrate as with the first lapping step. The second lapping step can remove fine irregularities formed on the main surfaces during the previous steps of the cutting step and the edge polishing step. Therefore, a subsequent polishing step for the main surfaces can be completed in a short period of time.

(4) Edge Polishing Step

Then the outer circumferential surface and the inner circumferential surface of the glass substrate were mirror-polished by a brush polishing method. At that time, slurry (free abrasive particles) containing cerium oxide abrasive particles was used as abrasive particles for polishing. Then the glass substrate subjected to the edge polishing step was cleaned with water. With this edge polishing step, the edges of the glass substrate were formed into a mirror finish, which could prevent deposition of sodium and potassium.

(5) Main Surface Polishing Step (First Polishing Step)

A first polishing step was carried out as a main surface polishing step. The first polishing step is carried out primarily for removing scratches or distortions remaining on the main surfaces after the aforementioned lapping step. In the first polishing step, the main surfaces were polished with hard resin polishers by a double-sided polishing device having a planetary gear mechanism. Cerium oxide abrasive particles were used as an abrasive.

(6) Chemical Strengthening Step

Next, a chemical strengthening process was performed on the glass substrate subjected to the aforementioned lapping steps and polishing steps. In the chemical strengthening process, potassium nitrate (60%) and sodium nitrate (40%) were mixed with each other to prepare a chemical strengthening liquid. The chemical strengthening liquid was heated to 400° C. The cleaned glass substrate was preheated to 300° C. and immersed in the chemical strengthening liquid for about 3 hours. In order to chemically strengthen the entire surfaces of the glass substrate, the glass substrate was immersed in a state in which a plurality of glass substrates were received in a holder and held at their edges.

Thus, by the immersion process in the chemical strengthening liquid, lithium ions and sodium ions in the surface layer of the glass substrate are replaced with sodium ions and potassium ions in the chemical strengthening liquid, respectively, so that the glass substrate is strengthened. The thickness of a compressive stress layer formed on the surface layer of the glass substrate was about 100 μm.

The glass substrate subjected to the chemical strengthening process was immersed in a water tank of 20° C. and rapidly cooled. The glass substrate was held in that state for about 10 minutes. Then the rapidly cooled glass substrate was immersed in 10 weight % sulfuric acid that had been heated to about 40° C. and cleaned therein. Furthermore, the glass substrate subjected to the sulfuric acid cleaning was sequentially immersed in cleaning tanks of pure water and isopropyl alcohol (IPA).

(7) Main Surface Polishing Step (Final Polishing Step)

Next, a second polishing step was carried out as a final polishing step. The second polishing step is carried out primarily for mirror-finishing the main surfaces of the glass substrate. In the second polishing step, the main surfaces were mirror-polished with soft foaming resin polishers by a double-sided polishing device having a planetary gear mechanism. Cerium oxide abrasive particles (with a mean particle diameter of 0.8 μm) that were finer than the cerium oxide abrasive particles used in the first polishing step were used as an abrasive. The glass substrate subjected to the second polishing step was sequentially immersed and cleaned in cleaning tanks of neutral detergent, pure water, and IPA. Ultrasonic waves were applied to each of the cleaning tanks.

As described above, a flat, smooth, and highly rigid substrate for a magnetic disk was obtained by the first lapping step, the cutting step, the second lapping step, the edge polishing step, the first polishing step, the chemical strengthening step, and the second polishing step.

After the polishing, the glass base material 1a was cleaned so that abrasives and impurities attached to the surfaces of the glass base material 1a during the manufacturing process were removed. In this manner, 100 glass substrates 1 were completed.

The shape profiles of inside holes and outer circumferences of 100 glass substrates 1 were measured with a circularity measurement device (RA-324 manufactured by Mitutoyo Corporation). Roundness analysis software OmniRound produced by Digital Metrology Solutions, Inc. was used to filter the profiles with a Gaussian filter. Then a difference R between the least-square-approximated circle 27 and the profile 21 was obtained for each of the glass substrates 1. Furthermore, a concentricity was also obtained for each of the glass substrates 1.

The number of sampling points was 3,600 for every 0.1 degree.

Next, a histogram of the differences was generated to obtain an amendment concentricity AC.

Then a magnetic layer 18b, a protective layer 18c, and a lubricating layer 18d were provided on the surface of the glass substrate 1. Thus, a magnetic recording medium 100 was produced. The measurement system illustrated in FIG. 15 was used to obtain an axial displacement 3 s under conditions in which the rotational speed was 5,400 rpm and the measurement position r was 30 mm.

Subsequently, the amendment concentricity AC and the axial displacement 3 s, which represents the disk balance/TMR characteristics, were plotted to obtain a relationship therebetween.

FIG. 14 shows the generated histogram. FIG. 18 shows a correlation between the amendment concentricity AC of the glass substrate 1 and the TMR characteristics (axial displacement 3 s). For reference, FIG. 18 also shows a relationship between the concentricity C and the axial displacement 3 s.

As is apparent from FIG. 18, when an amendment concentricity AC was used, the axial displacement 3 s more rapidly changed as compared to a case where a concentricity C was used. Thus, a strong correlation existed between the amendment concentricity AC and the axial displacement 3 s.

Specifically, it can be seen from FIG. 18 that, for example, a glass substrate 1 having an amendment concentricity AC of 9.6 μm or less should be determined as a non-defective product in order to obtain a glass substrate 1 having an axial displacement 3 s of 0.6 μm or less.

It can be seen from the above results that the shape of an inside hole 5 of a glass substrate 1 can be formed so as to meet demands for the disk balance/TMR characteristics (axial displacement 3 s) based upon an amendment concentricity AC as a parameter according to the present invention.

Third Embodiment

Glass substrates having AC of 8.0 μm and 5.0 μm (A2, B2, and C2) were produced with regard to each of the samples described at "(skewness and kurtosis)," i.e., (A) a glass substrate in which a skewness (Sk) was in a range of 0.55 to −0.55 and a value (Ku−3) obtained by subtracting 3 from a kurtosis (Ku) was in a range of 1.6 to −1.6, (B) a glass substrate in which a skewness was out of the range described for (A) and a value (Ku−3) obtained by subtracting 3 from a kurtosis (Ku) was in the range described for (A), and (C) a glass substrate in which a skewness was in the range described for (A) and a value (Ku−3) obtained by subtracting 3 from a kurtosis (Ku) was out of the range described for (A). The TMR characteristics were compared while the rotational speed for a TMR test was 10,000 rpm. As a result, the glass substrates having AC of 5.0 μm exhibited good TMR characteristics in the same order of A, B, and C. The results showed that servo errors could be prevented even at a high track density having a storage capacity of at least 500 GBytes (380 kTPI to 420 kTPI) per one 2.5-inch disk.

Fourth Embodiment

Three types of samples (A3, B3, and C3) as in the third embodiment were produced using the same crystallized glass as described in the first embodiment. The TMR characteristics were compared at a rotational speed of 10,000 rpm. Then, more favorable results were obtained in the same order of A, B, and C. The circularity of the inside hole and the outer circumference and the concentricity of the inside hole and the outer circumference are all set to be 0.5 μm.

Specifically, even in a case where the circularity of the inside hole and the outer circumference and the concentricity of the inside hole and the outer circumference are as small as 0.5 μm or less, the TMR characteristics can further be improved with use of crystallized glass by setting the AC, the skewness (Sk), and the value (Ku−3) obtained by subtracting 3 from the kurtosis (Ku) within the aforementioned ranges.

Fifth Embodiment

A fifth embodiment of the present invention will be described below in detail with reference to FIGS. 19A to 25. The reference numerals illustrated in FIGS. 19A to 25 are used for explanation of the fifth embodiment and separated from the reference numerals of FIGS. 1A to 18 described in the first and second embodiments. In other words, the reference numerals used in the fifth embodiment are used for explanation of FIGS. 19A to 25. This holds true for the step numbers. The step numbers used in the fifth embodiment are used for explanation of the fifth embodiment. Part of information overlapping with the first and second embodiments is described in the first and second embodiments.

The fifth embodiment of the present invention will be described below in detail with reference to the accompanying drawings.

First of all, a structure of a glass substrate 1 according to the fifth embodiment will briefly be described with reference to FIGS. 19A to 19C.

Figure 19A:
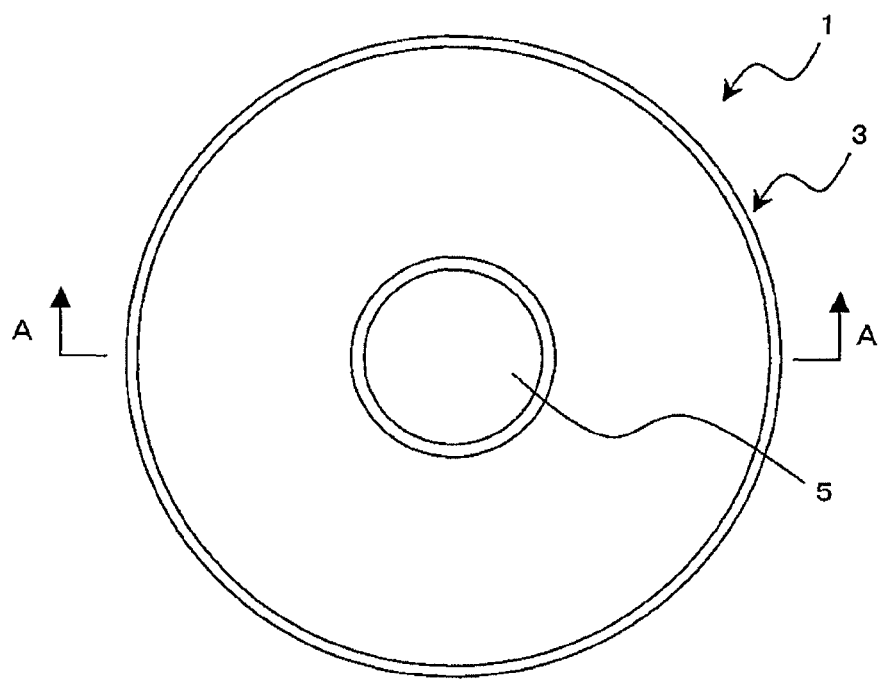
FIG. 19A is a plan view of a glass substrate 1.

As shown in FIG. 19A, the glass substrate 1 has a body 3 having a disk-like shape. The body 3 has an inside hole 5 formed at the center thereof.

Figure 19B:
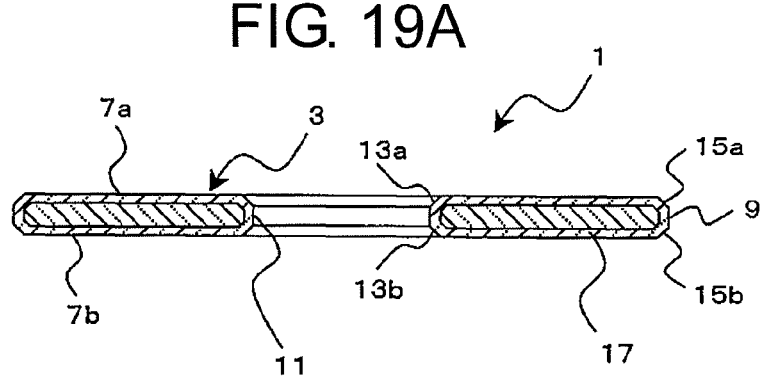
FIG. 19B is a cross-sectional view taken along line A-A of FIG. 19A.
Figure 19C:
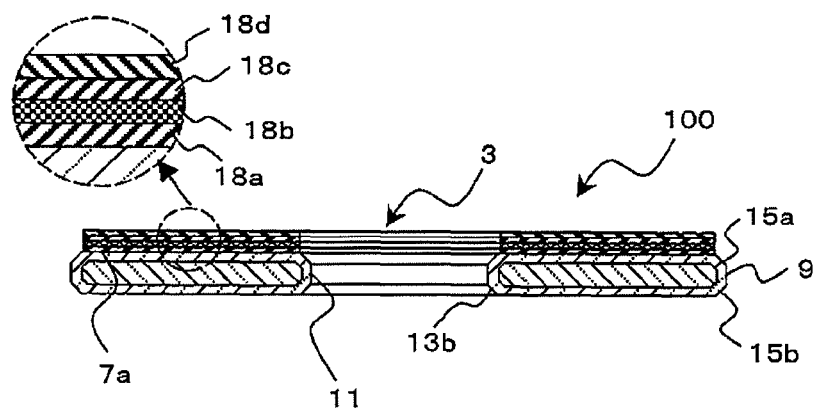
FIG. 19C is a cross-sectional view showing a magnetic recording medium 100.

As shown in FIG. 19B, the body 3 has main surfaces 7a and 7b that are substantially flat.

A layer for recording and reading information is formed on the main surfaces 7a and 7b. For example, as shown in FIG. 19C, an underlayer 18a, a magnetic layer 18b, a protective layer 18c, and a lubricating layer 18d are provided on one or both of the main surfaces 7a and 7b to thereby form a magnetic recording medium 100 (magnetic disk) along with the glass substrate 1. At least the magnetic layer 18b is required as a recording layer.

Furthermore, as shown in FIG. 19B, the body 3 has an inner circumferential surface 11 and an outer circumferential surface 9, which are perpendicular to the main surfaces 7a and 7b.

The inner circumferential surface 11 and the outer circumferential surface 9 are chamfered so as to have inner chamfered surfaces 13 and outer chamfered surfaces 15, respectively.

Furthermore, a chemical strengthening layer 17 is formed on the surfaces of the body 3.

For example, the chemical strengthening layer 17 is a compressive stress layer in which part of ions of glass as a material of the glass substrate 1 has been replaced with ions having a larger ionic radius. The detail of the chemical strengthening layer 17 will be described later.

The glass substrate 1 has such a shape that a parameter calculated from a radial position from its center and the thickness (a distance between the main surface 7a and the main surface 7b) at that radial position is within a predetermined range. The detail of the shape of the glass substrate 1 will be described later.

Next, a method of manufacturing a glass substrate 1 will be described with reference to FIG. 19A to 25.

In the following description, glass in a manufacturing process is referred to as a "glass base material 1a," and a finished product is referred to as a "glass substrate 1."

Figure 20:
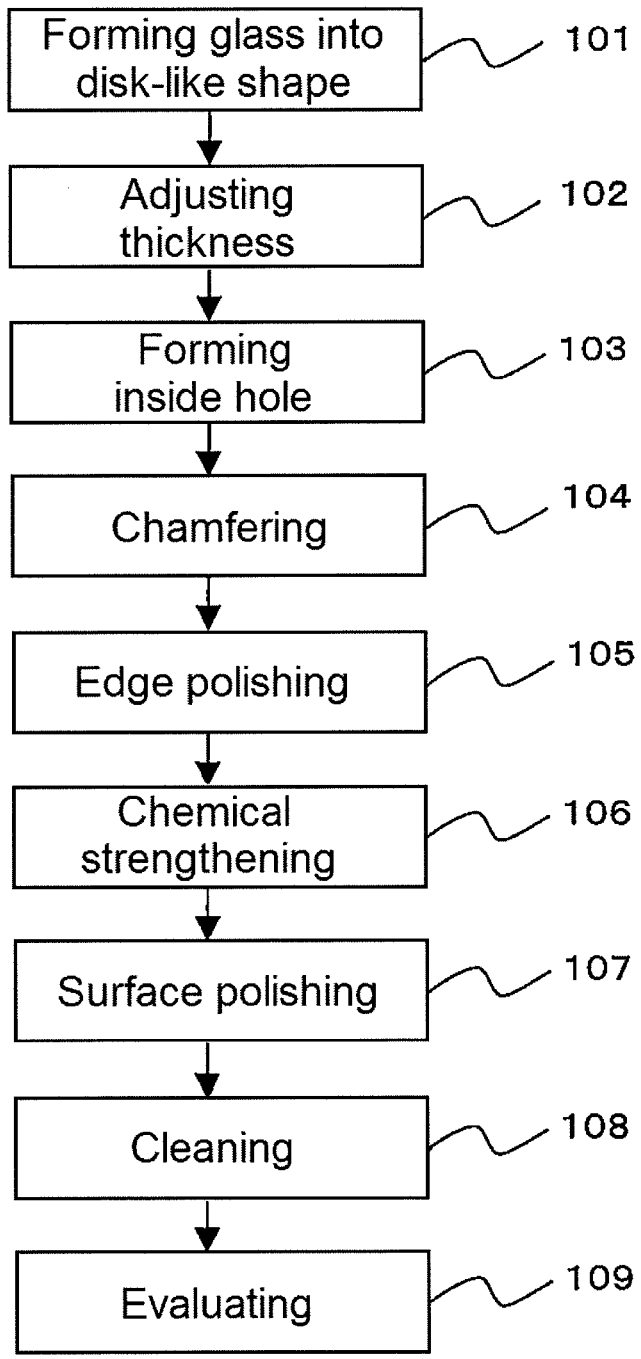
FIG. 20 is a flow chart showing the detail of a manufacturing method of a glass substrate 1.

First, as shown in FIG. 20, material glass is formed into a disk-like shape to produce a glass base material 1a (Step 101).

Examples of the material glass include soda-lime glass, aluminosilicate glass, borosilicate glass, and crystallized glass produced by, for example, a float method, a down-draw method, a redraw method, or a press method.

In the following description, glass produced by a press method will be described by way of example.

Subsequently, main surfaces 7a and 7b are ground with a grinder (first lapping) for adjusting the thickness of the glass base material 1a (Step 102).

For example, the grinding is conducted with a double-sided lapping device and abrasive particles such as alumina.

Then, as shown in FIG. 20, an inside hole 5 (see FIG. 19A) is formed at the center of the glass base material 1a (Step 103).

The inside hole 5 is formed by, for example, using a core drill.

If sheet glass is used, Steps 101-103 are not carried out. Instead, glass is cut into a disk-like shape from the sheet with use of a cutter, and then an inside hole 5 is cut out of the glass (cutting step).

Next, as shown in FIG. 20, an inner circumferential surface 11 and an outer circumferential surface 9 are chamfered for removing cracks of edges of the glass base material 1a (Step 104). The inner circumferential surface 11 and the outer circumferential surface 9 are chamfered with use of a grindstone having diamond abrasive particles fixed thereon.

A step of grinding the main surfaces 7a and 7b (second lapping) may be added after the chamfering. With this step, irregularities of the main surfaces that have been produced by the formation of the inside hole 5 or the chamfering can be ground so that a load on polishing can be reduced.

Subsequently, as shown in FIG. 20, a polishing step of the inner circumferential surface 11 and the outer circumferential surface 9 of the glass base material 1a (edge polishing) is carried out (Step 105).

For example, the edge polishing is conducted with use of a rotary brush.

Then, as shown in FIG. 20, a chemical strengthening treatment is performed on the glass base material 1a to form a chemical strengthening layer 17 on the glass base material 1a (Step 106).

Specifically, the glass is immersed in a chemical strengthening liquid so that ions contained in the chemical strengthening liquid that have an ionic radius larger than ionic radii of ions contained in the glass are ion-exchanged with the ions contained in the glass. Thus, a chemical strengthening layer 17 is formed.

After the chemical strengthening, the glass base material 1a is cleaned so that the chemical strengthening liquid is removed from the surfaces of the glass base material 1a. Thereafter, as shown in FIG. 20, the main surfaces 7a and 7b of the glass base material 1a are polished in order to adjust (substantially smoothen) the flatness and the surface roughness of the main surfaces 7a and 7b (Step 107).

The polishing is conducted with, for example, a double-sided polishing device and a hard resin polisher by using a planetary gear mechanism. For example, slurry in which abrasive particles of cerium oxide, lanthanum oxide, or the like have been dispersed in water is used as a polishing liquid.

After the polishing, the glass base material 1a is cleaned so that abrasives and impurities attached to the surfaces of the glass base material 1a during the manufacturing process are removed (Step 108).

Specific examples of the cleaning process include physical cleaning such as scrubbing cleaning or ultrasonic cleaning, and chemical liquid cleaning using fluoride, organic acid, hydrogen peroxide, surface-active agent, or the like.

In this example, (1) Step 102 (first lapping), (2) the second lapping, which may be conducted after the chamfering (Step 104), and (3) Step 107 (polishing step) of Steps 101-108 are likely to produce variations in thickness, which exert influence on the disk shape balance/TMR characteristics on which the present invention has focused attention. Therefore, for example, it is necessary to prevent variations in process pressure for each of batch processes by making a thickness difference of a substrate material to be provided less than 100 μm and holding at least a predetermined number of substrates in a carrier holder (with a filling factor higher than 90%) in (1) Step 102. Furthermore, it is necessary to prevent variations in thickness as much as possible in a first processing stage of all of the processing steps by varying a process load depending upon the stage of grinding (e.g., initial stage/intermediate stage/final stage). Particularly, a machining allowance (grinding allowance) to an initial thickness of a substrate material is often the largest in Step 102. Therefore, the most attention should be paid to Step 102 in order to prevent thickness variations.

Furthermore, the same considerations as for (1) Step 102 should be taken into account in (2) the second lapping. It is preferable to make a thickness difference of a workpiece to be provided (that has been subjected to the first lapping step) less than 10 μm.

Moreover, the same considerations as for (2) the second lapping should be taken into account in (3) the polishing step. It is preferable to make a thickness difference of a workpiece to be provided that has been subjected to the chemical strengthening step (Step 106) less than 1 μm.

Finally, a product inspection (thickness inspection) is performed (Step 109).

Now the detail of Step 109 will be described with reference to FIGS. 21 to 25.

As described above, the glass substrate 1 has such a shape that a parameter calculated from a radial position from its center and the thickness (a distance between the main surface 7a and the main surface 7b) at that radial position is within a predetermined range. In order to evaluate such a parameter, the thickness of the glass substrate 1 is measured so as to obtain the parameter. Then whether or not the parameter is within the predetermined range is determined.

Specifically, an inspection is performed in the following manner.

Figure 21:
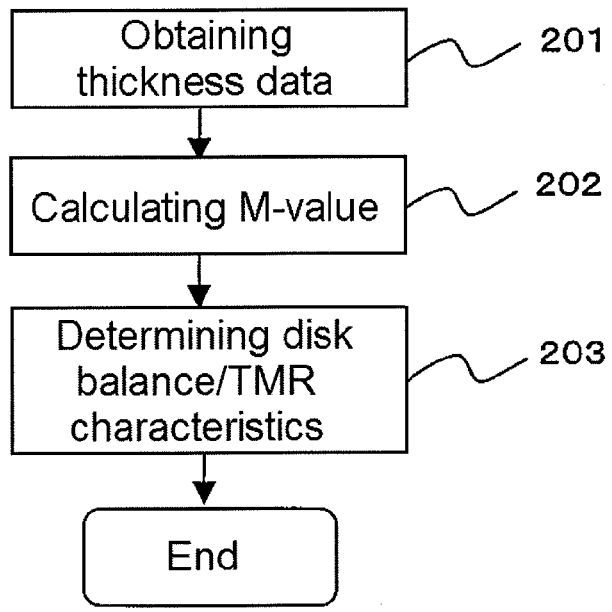
FIG. 21 is a flow chart showing the detail of Step 109 in FIG. 20.

First, as shown in FIG. 21, the thickness of the glass substrate 1 (distance between the main surface 7a and the main surface 7b) is measured at a plurality of radial positions from the center of the glass substrate 1 over the entire main surfaces of the glass substrate 1 with a known thickness measurement device or the like (Step 201).

Figure 22:
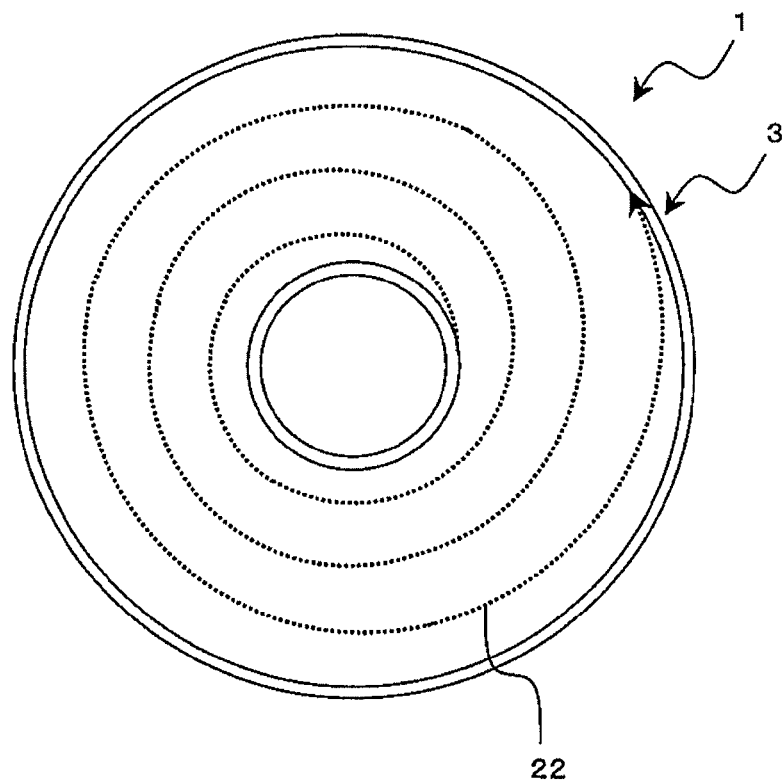
FIG. 22 is a diagram explanatory of Step 109 in FIG. 20.

At that time, it is preferable to measure the thickness of the glass substrate 1 such that measurement points 22 are arranged along a spiral path from a certain location of the inner circumference to a certain location of the outer circumference as shown in FIG. 22.

When the thickness of the glass substrate 1 is measured along the above spiral path, thickness data can be obtained uniformly at radial positions from the center of the glass substrate 1 along the whole main surface of the glass substrate 1. Particularly, a magnetic disk is rotated via a spindle. When information stored in the magnetic disk is read by a magnetic head, the magnetic head performs a seeking operation on the magnetic disk. At that time, the path of the magnetic head moving above the magnetic disk draws a spiral line on the magnetic disk. Therefore, when the thickness of the glass substrate 1 is measured along a spiral path as described above, it is possible to obtain thickness information corresponding to movement of the head.

Then, as shown in FIG. 21, an M-value, which is a parameter calculated from the relationship between the measurement position in the radial direction and the thickness of the glass substrate 1, is calculated (Step 202).

An M-value is the sum total of products of a thickness difference between a thickness at the first measurement point and a thickness at each of the measurement points and a radius of that measurement point (the sum total of values corresponding to a moment at each of the measurement points). An M-value is given by the following formulas (1) and (2).

$$M = \sum_{i=0}^{n} r_i^2 \Delta t_i \quad (1)$$

$$\Delta t_i = t_i - t_0 \quad (2)$$

In the formulas (1) and (2), n is the number of samples, $r_i$ is a radius of a measurement point, $t_i$ is a thickness at the measurement point, and $t_0$ is a thickness at an initial measurement point (thickness of an inner circumferential edge).

Figure 23:
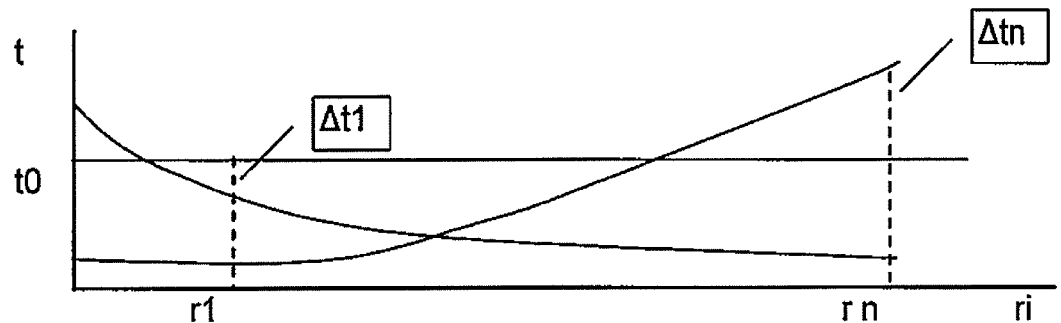
FIG. 23 is a diagram explanatory of Step 109 in FIG. 20.
Figure 24:
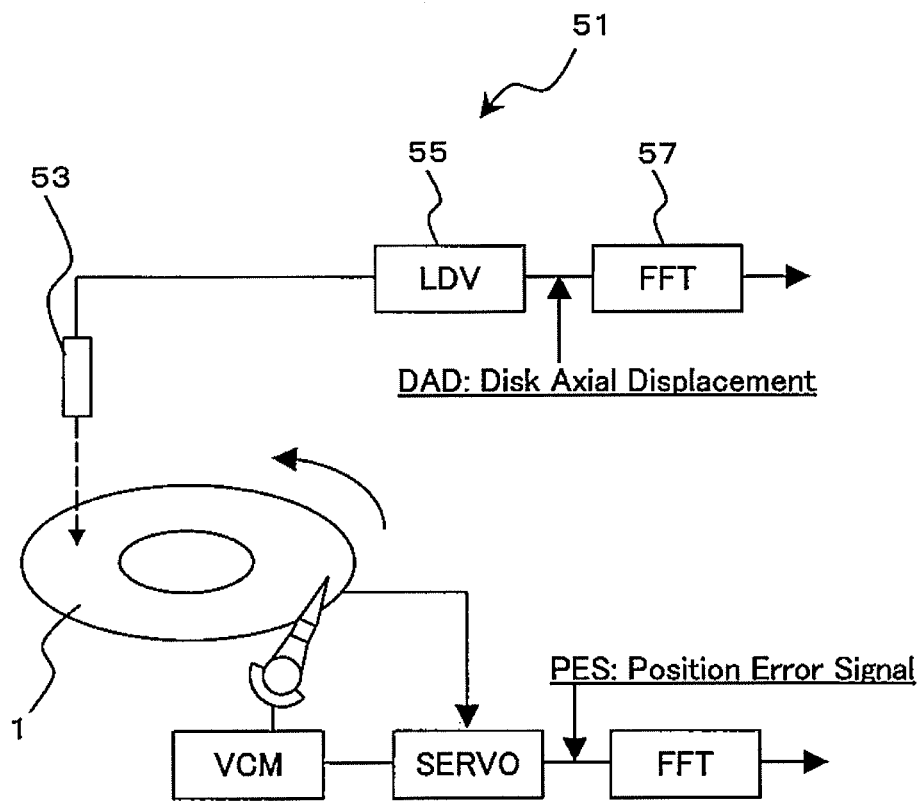
FIG. 24 is a conceptual diagram showing a measurement system 51 for TMR characteristics (axial displacement 3 s)

FIG. 23 shows an example of the relationship between measurement position in the radial direction and the thicknesses as well as the formula (1).

The number of samples is defined by using, as one sampling unit, the transverse size or the transverse resolution of a measurement probe in a thickness measurement system being used. For example, the laser spot diameter or the transverse resolution determined by the laser spot diameter is used as one sampling unit in a non-contact type measurement device.

As apparent from the formulas (1) and (2), an M-value is more affected by the thickness difference at portions near the outer circumferential edge (portions having a large radius r), i.e., variations of the thickness at portions near the outer circumferential edge as compared to variations of the thickness at portions near the inner circumferential edge.

Specifically, variations due to the disk flattering become larger near the outer circumferential edge as compared to the inner circumferential edge and increase an M-value because the inner circumferential edge is held by a spindle so as to have a higher rigidity than that of the outer circumferential edge. Therefore, variations in thickness at portions near the outer circumferential edge exert larger influence on the disk balance/TMR characteristics as compared to variations in thickness at portions near the inner circumferential edge.

In the above formulas (1) and (2), the thickness difference Δt is defined by a difference between the thickness at the initial measurement point and the thickness at each of the measurement points. Nevertheless, the thickness at each of the measurement points may simply be used instead of Δt. Specifically, the following formula (3) may be used.

$$M = \sum_{i=0}^{n} r_i^2 t_i \quad (3)$$

In the formula (3), n is the number of samples, $r_i$ is a radius of a measurement point, and $t_i$ is a thickness at the measurement point.

Subsequently, whether or not the disk balance/TMR characteristics of the glass substrate 1 are within a predetermined range is determined from the measured M-value. If the disk balance/TMR characteristics of the glass substrate 1 are within the predetermined range, then the glass substrate 1 is regarded as a non-defective product. Otherwise, the glass substrate 1 is regarded as a defective product (Step 203).

Figure 25:
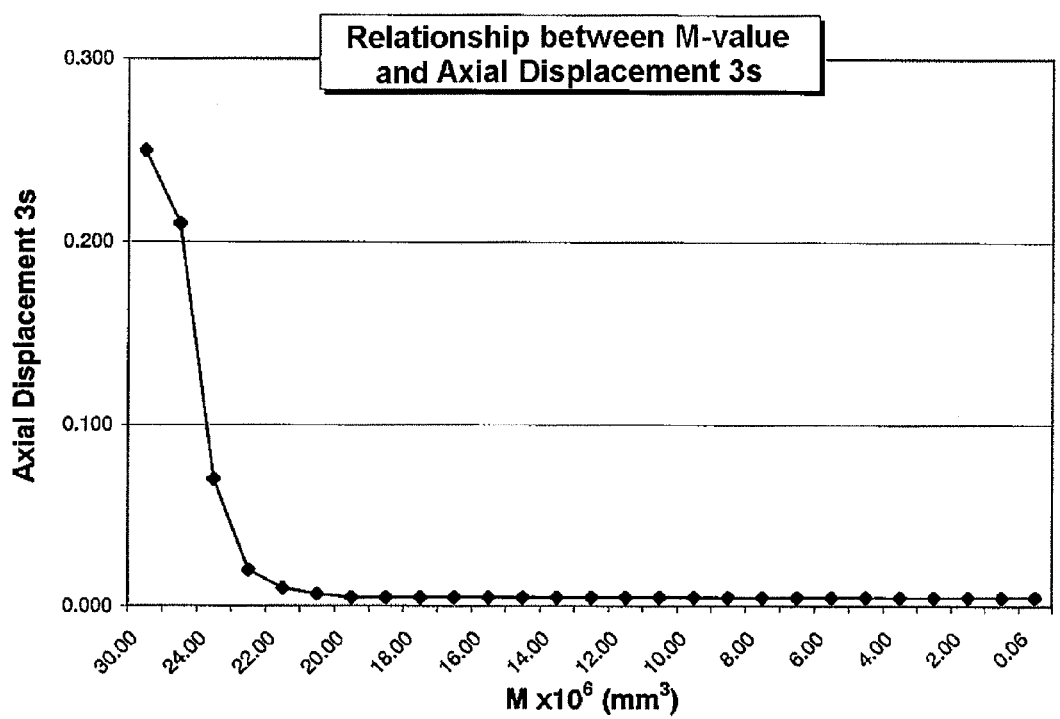
FIG. 25 is a correlation diagram of an M-value and an axial displacement 3 s.

Specifically, whether or not the M-value is within the predetermined range is determined from the relationship between the M-value and the axial displacement 3 s as shown in FIG. 25. If the M-value is within the range, the glass substrate 1 is regarded as a non-defective product. Otherwise, the glass substrate 1 is regarded as a defective product.

The axial displacement 3 s is a track positioning error of an average +3 s calculated by integrating substrate vibration measurement data (vibration waveforms) for each rotational speed and for each frequency. For example, 3 s and $s^2$ are calculated by the following formulas (4) and (5).

$$3s = 3\sqrt{\int_0^f PSD_{PES}(f) df} \quad (4)$$

$$s^2 = \int_0^f PSD_{DAD}(f) df \quad (5)$$

In the formulas (4) and (5), PSD is an energy spectral density, PES is a position error signal, and DAD is a disk axial displacement.

Now there will briefly be described a method of obtaining the relationship between the M-value and the axial displacement 3 s as shown in FIG. 25.

First, a predetermined number of glass substrates 1 to be inspected are produced, and the M-values of those glass substrates 1 are obtained.

Then a magnetic layer 18b, a protective layer 18c, and a lubricating layer 18d are provided on surfaces of each of the glass substrates 1. Thus, magnetic recording media 100 are produced. With use of a measurement system 51 illustrated in FIG. 24, the axial displacement 3 s is obtained at a certain rotational speed and a certain measurement point.

The measurement system 51 will briefly be described. The measurement system 51 has a laser Doppler velocimeter (LDV) 55 with a head 53 and a converter 57 for performing a fast Fourier transform (FFT) on data measured by the laser Doppler velocimeter 55.

Then the M-value and the axial displacement 3 s, which represents the disk balance/TMR characteristics, are plotted so as to generate a correlation diagram as shown in FIG. 25.

The above is the detail of Step 109.

Thus, according to the present embodiment, a parameter (M-value) of the glass substrate 1 that is calculated from a relationship between a radial position from the center of the glass substrate 1 and a thickness at that position is within a predetermined range that meets the requirements for the disk balance/TMR characteristics.

Therefore, servo information including track information being stored can stably be read from a magnetic disk when the glass substrate 1 is used for an HDD.

Example 3

The fifth embodiment will be described in greater detail based upon some examples. The following examples and comparative examples are provided for explaining the fifth embodiment.

Glass substrates for a magnetic disk having an outside diameter of 65 mm, an inside diameter of 20 mm, and a thickness of 0.635 mm were produced in the following manner. The thickness of the glass substrates was measured, and the correlation between the M-value and the disk balance/TMR characteristics was obtained.

First, 100 glass substrates 1 were produced in the following manner.

(1) Shaping Step and First Lapping Step

In a method of manufacturing a glass substrate for a magnetic disk according to this example, a surface of a glass plate is lapped (ground) into a glass base material. A glass disk is cut out of the glass base material. Various glass plates may be used for the glass plate described above. For example, the glass plate may be produced from molten glass by known methods such as a press method, a float method, a down-draw method, a redraw method, and a fusion method. Among others, a press method can produce a glass plate inexpensively.

In this example, molten aluminosilicate glass was shaped into a disk by direct press using an upper mold, a lower mold, and a shell mold. Thus, an amorphous glass plate was obtained. The aluminosilicate glass primarily contained $SiO_2$ of 58 weight % to 75 weight %, $Al_2O_3$ of 5 weight % to 23 weight %, $Li_2O$ of 3 weight % to 10 weight %, and $Na_2O$ of 4 weight % to 13 weight %.

Then both of main surfaces of the glass plate were subjected to a lapping process. Thus, a disk-like glass base material was formed. The lapping step was carried out with free alumina-based abrasive particles by a double-sided lapping device using a planetary gear mechanism. Specifically, lapping surface plates were pressed upon both surfaces of the glass plate from an upper side and a lower side of the glass plate. A grinding liquid including free abrasive particles was supplied onto the surfaces of the glass plate. The lapping surface plates and the glass plate were moved relative to each other. Thus, a lapping step was carried out. A glass base material having flat main surfaces was obtained by the lapping step.

For the lapping process, a thickness difference of a substrate material to be provided was made less than 100 μm in order to prevent variations in thickness of glass substrates. At least a predetermined number of substrates were held in a carrier holder for holding substrate materials (with a filling factor higher than 90%), so that variations in process pressure were prevented for each of batch processes. Furthermore, variations in thickness of glass substrates were prevented as much as possible in a lapping stage by varying a process load depending upon the stage of grinding (e.g., initial stage/intermediate stage/final stage).

(2) Cutting Step (Coring and Chamfering)

Next, an inside hole was formed at a central portion of the glass substrate with a cylindrical diamond drill. Thus, an annular glass substrate was formed (coring). Then an inner circumferential surface and an outer circumferential surface of the glass substrate were ground with diamond grindstone. Thus, a chamfering process was performed (chamfering).

(3) Second Lapping Step

Thereafter, a second lapping step was carried out on both of main surfaces of the obtained glass substrate as with the first lapping step. The second lapping step can remove fine irregularities formed on the main surfaces during the previous steps of the cutting step and the edge polishing step. Therefore, a subsequent polishing step for the main surfaces can be completed in a short period of time.

For the second lapping step, a thickness difference of a workpiece to be provided (that has been subjected to the first lapping step) was made less than 10 μm in order to prevent variations in thickness of glass substrates.

(4) Edge Polishing Step

Then the outer circumferential surface and the inner circumferential surface of the glass substrate were mirror-polished by a brush polishing method. At that time, slurry (free abrasive particles) containing cerium oxide abrasive particles was used as abrasive particles for polishing. Then the glass substrate subjected to the edge polishing step was cleaned with water. With this edge polishing step, the edges of the glass substrate were formed into a mirror finish, which could prevent deposition of sodium and potassium.

(5) Main Surface Polishing Step (First Polishing Step)

A first polishing step was carried out as a main surface polishing step. The first polishing step is carried out primarily for removing scratches or distortions remaining on the main surfaces after the aforementioned lapping step.

In the first polishing step, the main surfaces were polished with hard resin polishers by a double-sided polishing device having a planetary gear mechanism. Cerium oxide abrasive particles were used as an abrasive.

For the main surface polishing step, a thickness difference of a workpiece to be provided that has been subjected to the first lapping step was made less than 5 μm in order to prevent variations in thickness of glass substrates.

(6) Chemical Strengthening Step

Next, a chemical strengthening process was performed on the glass substrate subjected to the aforementioned lapping steps and polishing steps. In the chemical strengthening process, potassium nitrate (60%) and sodium nitrate (40%) were mixed with each other to prepare a chemical strengthening liquid. The chemical strengthening liquid was heated to 400° C. The cleaned glass substrate was preheated to 300° C. and immersed in the chemical strengthening liquid for about 3 hours. In order to chemically strengthen the entire surfaces of the glass substrate, the glass substrate was immersed in a state in which a plurality of glass substrates were received in a holder and held at their edges.

Thus, by the immersion process in the chemical strengthening liquid, lithium ions and sodium ions in the surface layer of the glass substrate are replaced with sodium ions and potassium ions in the chemical strengthening liquid, respectively, so that the glass substrate is strengthened. The thickness of a compressive stress layer formed on the surface layer of the glass substrate was about 100 μm.

The glass substrate subjected to the chemical strengthening process was immersed in a water tank of 20° C. and rapidly cooled. The glass substrate was held in that state for about 10 minutes. Then the rapidly cooled glass substrate was immersed in 10 weight % sulfuric acid that had been heated to about 40° C. and cleaned therein. Furthermore, the glass substrate subjected to the sulfuric acid cleaning was sequentially immersed in cleaning tanks of pure water and isopropyl alcohol (IPA).

(7) Main Surface Polishing Step (Final Polishing Step)

Next, a second polishing step was carried out as a final polishing step. The second polishing step is carried out primarily for mirror-finishing the main surfaces of the glass substrate. In the second polishing step, the main surfaces were mirror-polished with soft foaming resin polishers by a double-sided polishing device having a planetary gear mechanism. Cerium oxide abrasive particles (with a mean particle diameter of 0.8 μm) that were finer than the cerium oxide abrasive particles used in the first polishing step were used as an abrasive. The glass substrate subjected to the second polishing step was sequentially immersed and cleaned in cleaning tanks of neutral detergent, pure water, and IPA. Ultrasonic waves were applied to each of the cleaning tanks.

As described above, a flat, smooth, and highly rigid substrate for a magnetic disk was obtained by the first lapping step, the cutting step, the second lapping step, the edge polishing step, the first polishing step, the chemical strengthening step, and the second polishing step.

After the polishing, the glass base material 1a was cleaned so that abrasives and impurities attached to the surfaces of the glass base material 1a during the manufacturing process were removed. In this manner, 100 glass substrates 1 were completed.

Then the thickness of 100 glass substrates 1 was measured along a spiral path from an inner circumference toward an outer circumference as shown in FIG. 22 with a non-contact type laser displacement meter (spot size of 20 μm) with LK-G15 (measurement head) and LK-G3001 (measurement controller) manufactured by Keyence Corporation. The spiral was an Archimedean spiral (uniform spiral). The total number of sampling points was 8,550,000 for every 20 μm. (Measurement was performed in an area where a radial position r=13.0 mm to 32.0 mm.) The number of measurement points (8,550,000) was determined by the following formula.

$$\text{The number of measurement points } N=\{\pi(32^2-13^2)\}/\pi(0.01^2)=8{,}550{,}000$$

In this formula, 32 and 13 represent radial positions (mm) of both ends, and 0.01 represents a radius of a spot size (mm).

Next, an M-value was calculated by the formulas (1) and (2) based upon the measured thickness and position (see Step 202).

Then a magnetic layer 18b, a protective layer 18c, and a lubricating layer 18d were provided on the surfaces of the glass substrate 1. Thus, a magnetic recording medium 100 was produced. The measurement system illustrated in FIG. 24 was used to obtain an axial displacement 3 s under conditions in which the rotational speed was 5,400 rpm and the measurement position r was 30 mm.

Subsequently, the M-value and the axial displacement 3 s, which represents the disk balance/TMR characteristics, were plotted to obtain a relationship therebetween.

As is apparent from FIG. 25, a strong correlation existed between the M-value and the axial displacement 3 s.

Specifically, in FIG. 25, the axial displacement 3 s was held constant at 0.005 μm when the M-value was not more than $20 \times 10^6$ mm$^3$. When the M-value became higher than $20 \times 10^6$ mm$^3$, the axial displacement 3 s abruptly increased.

In other words, an upper limit of the M-value for a glass substrate having good disk balance/TMR characteristics was $20 \times 10^6$ mm$^3$ because the axial displacement 3 s was held at a small constant value in FIG. 25 if the M-value was not more than $20 \times 10^6$ mm$^3$.

It can be seen from the above results that the thickness of a glass substrate 1 can be formed so as to meet demands for the disk balance/TMR characteristics (axial displacement 3 s) based upon a parameter (M-value) according to the present invention.

(Thickness and M-Value)

The thickness of the glass substrate 1 was measured at three points of an inner position (with a radius of 15 mm), an intermediate position (with a radius of 22 mm), and an outer position (with a radius of 30 mm) of the magnetic disk on a straight line passing through the center of the glass substrate 1. An average of the three thicknesses was defined as a thickness of the glass substrate 1. The relationship between the thickness and the TMR characteristics was examined. As a result, some of glass substrates 1 having the same thickness exhibited good TMR characteristics, and others not. M-values were calculated for glass substrates 1 exhibiting favorable TMR characteristics and for glass substrates 1 exhibiting unfavorable TMR characteristics. The M-values for glass substrates 1 exhibiting favorable TMR characteristics were not more than $20 \times 10^6$ mm$^3$, and the M-values for glass substrates 1 exhibiting unfavorable TMR characteristics were higher than $20 \times 10^6$ mm$^3$.

Then glass substrates 1 having different thicknesses were produced. The TMR characteristics were obtained for each of the glass substrates 1. As a result, thicker glass substrates 1 exhibited favorable TMR characteristics with a higher ratio than thinner glass substrates 1. However, even if glass substrates 1 have the same thickness, some of them may exhibit favorable TMR characteristics, and others not. Therefore, good TMR characteristics can be obtained by evaluating glass substrates 1 with the aforementioned M-value ($\times 10^6$) mm$^3$.

INDUSTRIAL APPLICABILITY

In the first embodiment, the present invention is applied to a glass substrate for a magnetic recording medium. Nevertheless, the present invention is not limited to that example and is applicable to any disk-like recording medium in which a shape of an inside hole should be defined.

Furthermore, in the second embodiment, the present invention is applied to a glass substrate for a magnetic recording medium. Nevertheless, the present invention is not limited to that example and is applicable to any disk-like recording medium in which a shape of an inside hole should be defined.

Moreover, in the fifth embodiment, the present invention is applied to a glass substrate for a magnetic recording medium. Nevertheless, the present invention is not limited to that example and is applicable to any disk-like recording medium in which a thickness of the recording medium should be defined.

Although the first, second, third, fourth, and fifth embodiments have been described separately, those embodiments may properly be combined with each other.

What is claimed is:

1. A glass substrate for a magnetic disk with an inside hole formed therein, wherein:

a circularity of the inside hole is 5.5 μm or less, and a value of Sk calculated from a shape profile over a whole circumference of the inside hole is in a range of 0.55 to −0.55, and Sk is given by $$Sk = \sum_{i=1}^{n} \frac{R_i^3}{n\sigma^3} \qquad (1)$$

where n is the number of samples, and n=3600, $R_i$ is an ith difference between the shape profile and a least-square-approximated circle of the shape profile on a line drawn to the least-square-approximated circle of the shape profile from a center of a circle calculated by a least-square approximation of the shape profile over the whole circumference of the inside hole, and σ is a standard deviation.

2. The glass substrate for a magnetic disk as recited in claim 1, wherein a value (Ku−3) obtained by subtracting 3 from Ku calculated from the shape profile over the whole circumference of the inside hole is in a range of 1.6 to −1.6, and Ku is given by $$Ku = \sum_{i=1}^{n} \frac{R_i^4}{n\sigma^4} \qquad (3)$$

where n is the number of samples, and n=3600, $R_i$ is an ith difference between the shape profile and a least-square-approximated circle of the shape profile on a line drawn to the least-square-approximated circle of the shape profile from a center of a circle calculated by a least-square approximation of the shape profile of the inside hole, and σ is a standard deviation.

3. The glass substrate for a magnetic disk as recited in claim 1, wherein a circularity of the inside hole is 3 μm or less.

4. The glass substrate for a magnetic disk as recited in claim 1, wherein the glass substrate is used for a magnetic disk having a storage capacity of at least 80 GBytes per one 2.5-inch disk.

5. The glass substrate for a magnetic disk as recited in claim 1, wherein a value of AC calculated by using a value of $Sk_{ID}$ calculated from the shape profile over the whole circumference of the inside hole, a value of $Sk_{OD}$ calculated from a shape profile of an outer circumference of the glass substrate for a magnetic disk, and a value of a concentricity C is 9.6 μm or less, AC is given by $$AC = C\left(1 + \frac{Sk_{OD}}{Sk_{ID}}\right) \qquad (4)$$

$Sk_{ID}$ is given by $$Sk_{ID} = \sum_{i=1}^{n} \frac{R_i^3}{n\sigma^3} \quad (5)$$

where n is the number of samples, $R_i$ is an ith difference between the shape profile and a least-square-approximated circle of the shape profile on a line drawn to the least-square-approximated circle of the shape profile from a center of a circle calculated by a least-square approximation of the shape profile over the whole circumference of the inside hole, and σ is a standard deviation, and $Sk_{OD}$ is given by $$Sk_{OD} = \sum_{i=1}^{n} \frac{R_i^3}{n\sigma^3} \quad (6)$$

where n is the number of samples, $R_i$ is an ith difference between the shape profile and a least-square-approximated circle of the shape profile on a line drawn to the least-square-approximated circle of the shape profile with the smallest value of the shape profile from a center of a circle calculated by a least-square approximation of the shape profile of the outer circumference, and σ is a standard deviation.

6. The glass substrate for a magnetic disk as recited in claim 1, wherein an M-value calculated from a relationship between a radial position from a center of the glass substrate for a magnetic disk and a thickness at that radial position is within 20×10⁶ mm³, and the M-value is given by $$M = \sum_{i=0}^{n} r_i^2 \Delta t_i \quad (7)$$

$$\Delta t_i = t_i - t_0 \quad (8)$$

where n is the number of samples, $r_i$ is a radius of a measurement point, $t_i$ is a thickness at the measurement point, and $t_0$ is a thickness at an initial measurement point (thickness of an inner circumferential edge).

7. A magnetic recording medium comprising:

the glass substrate for a magnetic disk as recited in claim 1; and an underlayer, a magnetic layer, a protective layer, and a lubricating layer provided on a main surface of the glass substrate.

* * * * *